United States Patent
Anton et al.

(10) Patent No.: US 10,318,753 B2
(45) Date of Patent: Jun. 11, 2019

(54) SEMANTIC DATA STRUCTURE AND METHOD

(71) Applicant: CloudMode, LLC, Henderson, NV (US)

(72) Inventors: Dhryl Anton, Henderson, NV (US); Michael McFall, Henderson, NV (US)

(73) Assignee: Vescel, LLC

( * ) Notice: Subject to any disclaimer, the term of this patent is extended or adjusted under 35 U.S.C. 154(b) by 475 days.

(21) Appl. No.: 14/754,514

(22) Filed: Jun. 29, 2015

(65) Prior Publication Data
US 2016/0063100 A1    Mar. 3, 2016

Related U.S. Application Data

(60) Provisional application No. 62/019,363, filed on Jun. 30, 2014.

(51) Int. Cl.
*G06F 17/30* (2006.01)
*G06F 21/62* (2013.01)
*G06F 16/22* (2019.01)

(52) U.S. Cl.
CPC ...... *G06F 21/6227* (2013.01); *G06F 16/2219* (2019.01); *G06F 2221/2149* (2013.01)

(58) Field of Classification Search
CPC ..................................................... G06F 17/30
USPC ........................................................ 707/739
See application file for complete search history.

(56) References Cited

U.S. PATENT DOCUMENTS

| | | | | |
|---|---|---|---|---|
| 7,761,552 B2 * | 7/2010 | Nakamura | ........ | H04L 29/12584 709/220 |
| 8,265,925 B2 * | 9/2012 | Aarskog | ............... | G06F 17/271 704/1 |
| 8,285,697 B1 * | 10/2012 | Truher | ................ | H04L 67/1085 707/706 |
| 8,290,923 B2 * | 10/2012 | Kurapat | ................ | G06F 16/951 707/706 |
| 8,380,693 B1 * | 2/2013 | Xu | ....................... | G06F 16/9535 707/706 |
| 8,650,175 B2 * | 2/2014 | Hogue | ................... | G06F 16/951 707/706 |
| 8,706,758 B2 * | 4/2014 | Chew | ..................... | G06F 16/273 707/776 |

(Continued)

*Primary Examiner* — Kim T Nguyen
(74) *Attorney, Agent, or Firm* — Jensen-Haxel Law

(57) ABSTRACT

Disclosed is a method, a device, a system and/or a manufacture of a semantic data structure. In one embodiment, a physical memory usable to store information within a datastore comprises a number of domains. Each domain includes a unique identifier and organizes data into a domain structure that includes and an identity element, a content element, and a context element, each of which may be implemented as an EAV triplet. A fundamental instantiation of the domain structure contains a primitive data and a relational instantiation of the domain structure contains references to other domains. The references of the content element may be constrained, for example to a directed acyclic graph architecture, while references of the context element may reference any domain. Additional instantiations may build orders of referential structure, provide security and control of data resources within the datastore, and model users and application programs.

16 Claims, 28 Drawing Sheets

(56) References Cited

U.S. PATENT DOCUMENTS 9,069,979 B2 * 6/2015 Srinivasan .............. G06F 21/62
9,280,674 B2 * 3/2016 Fujisaki .................. G06F 21/62

* cited by examiner

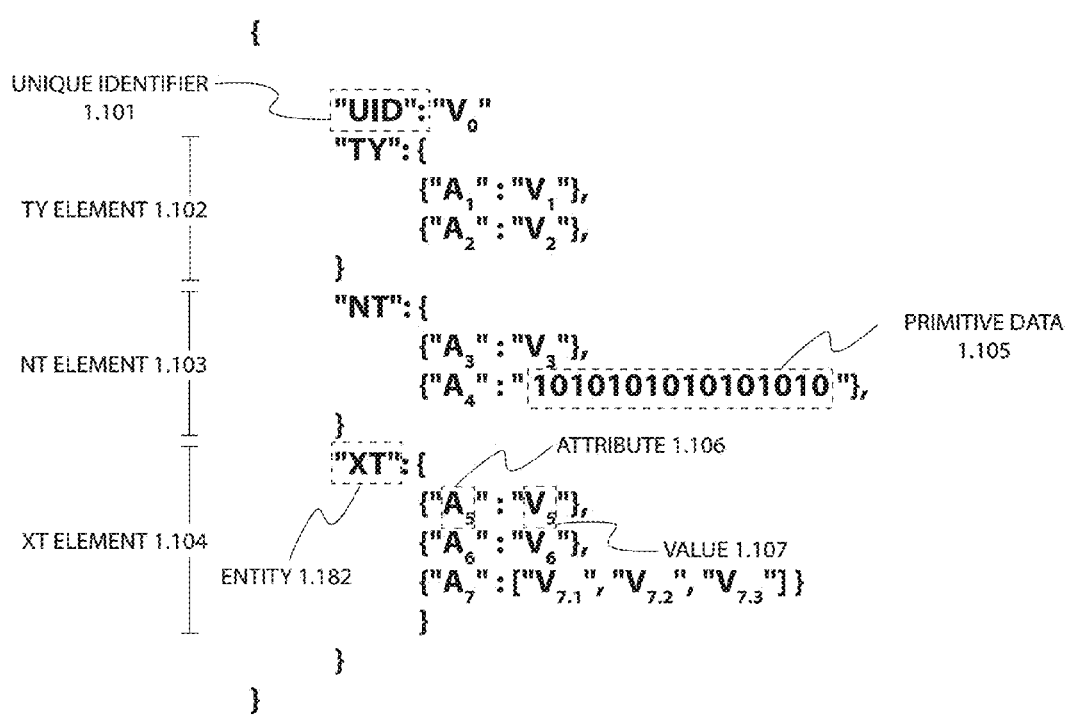
FIG. 1D  Document Format Storage 1.180 of Domain shown in JSON Notation

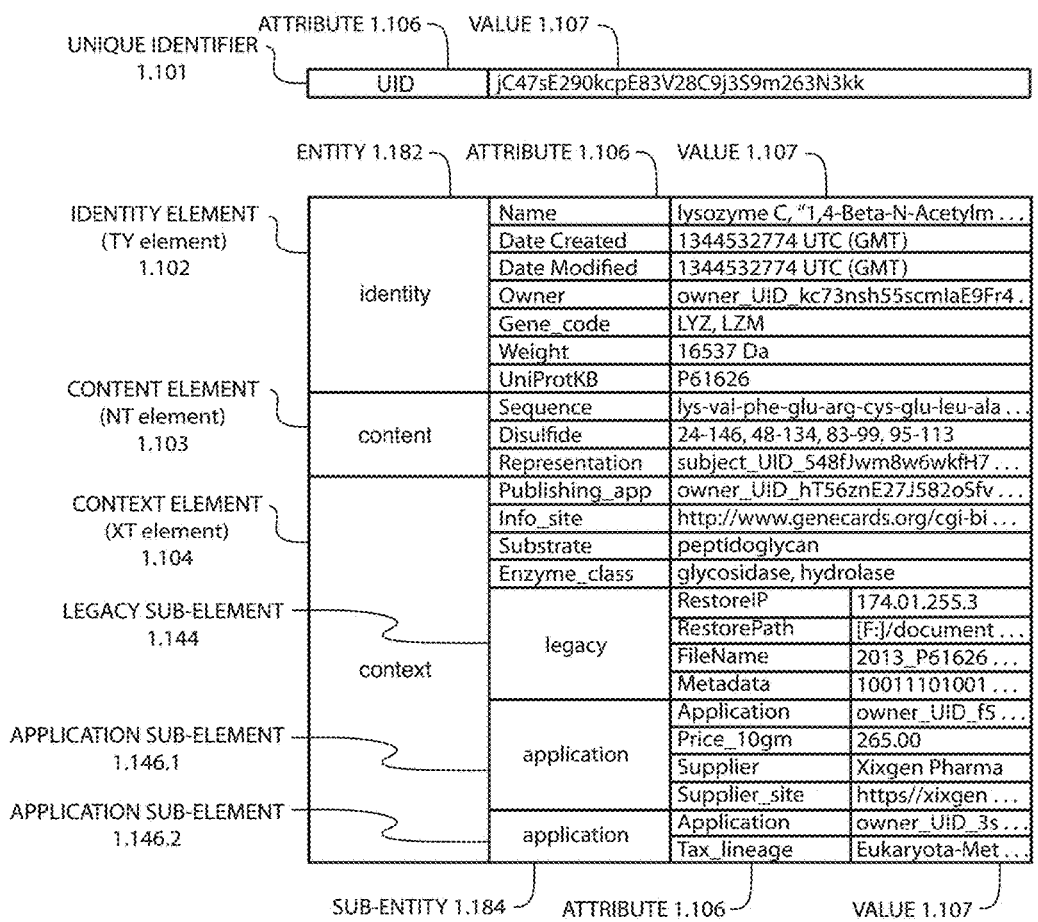
FIG. 1E  Entity-Attribute-Value Representation 1.190

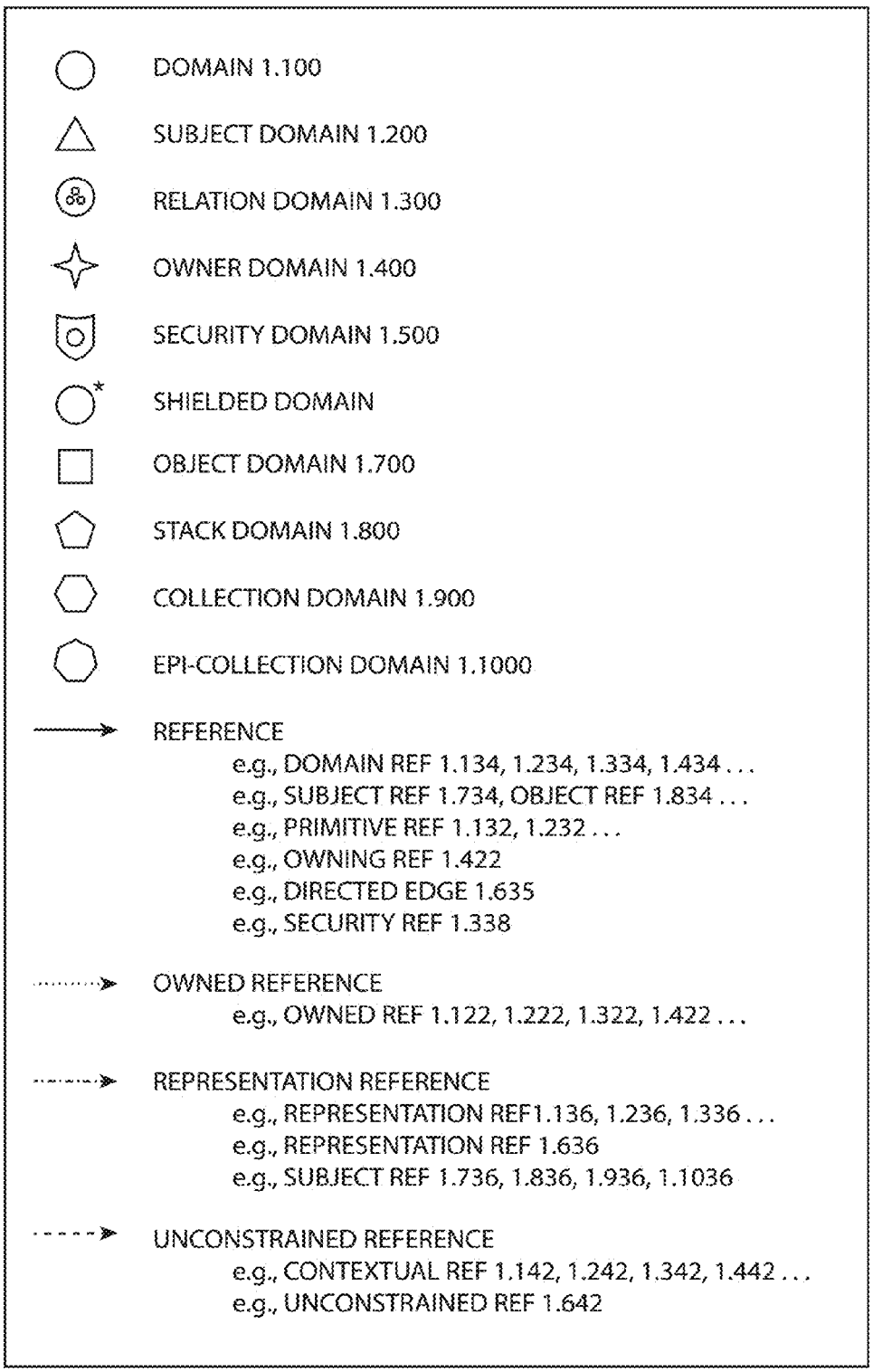
FIG. 1F    Domain Key 199

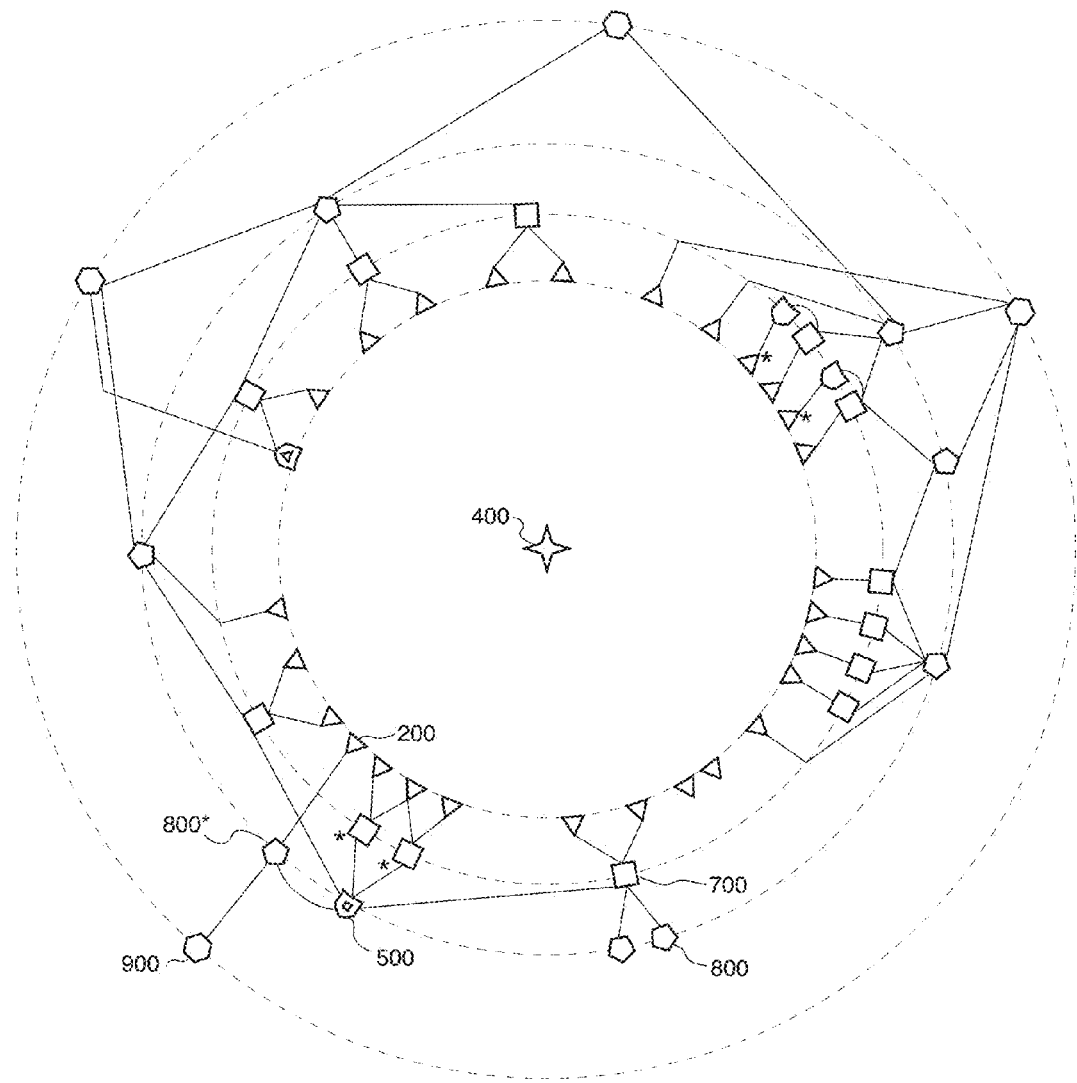
FIG. 14  Domain Map 1400

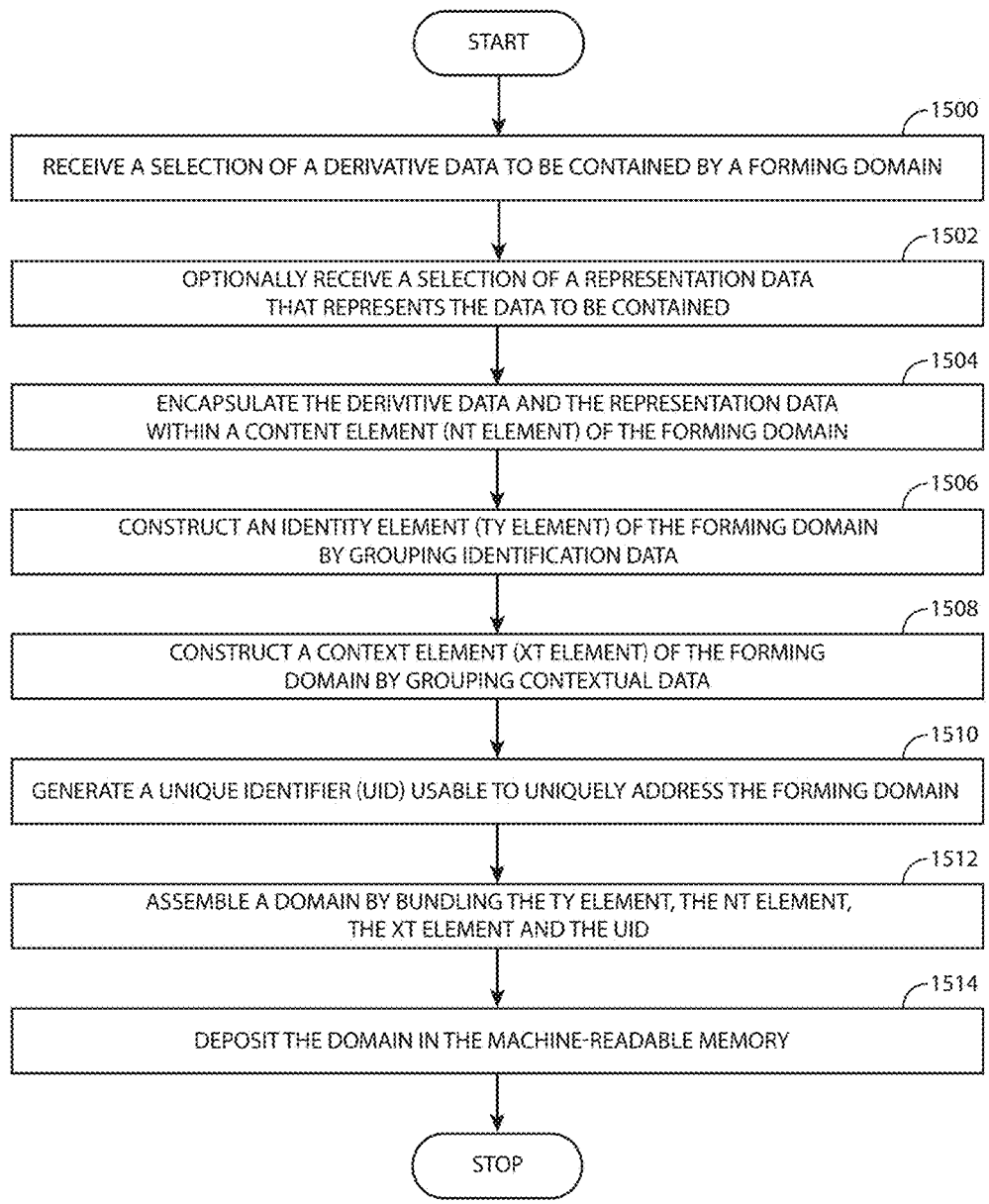
FIG. 15  Domain Creation Process Flow 1550

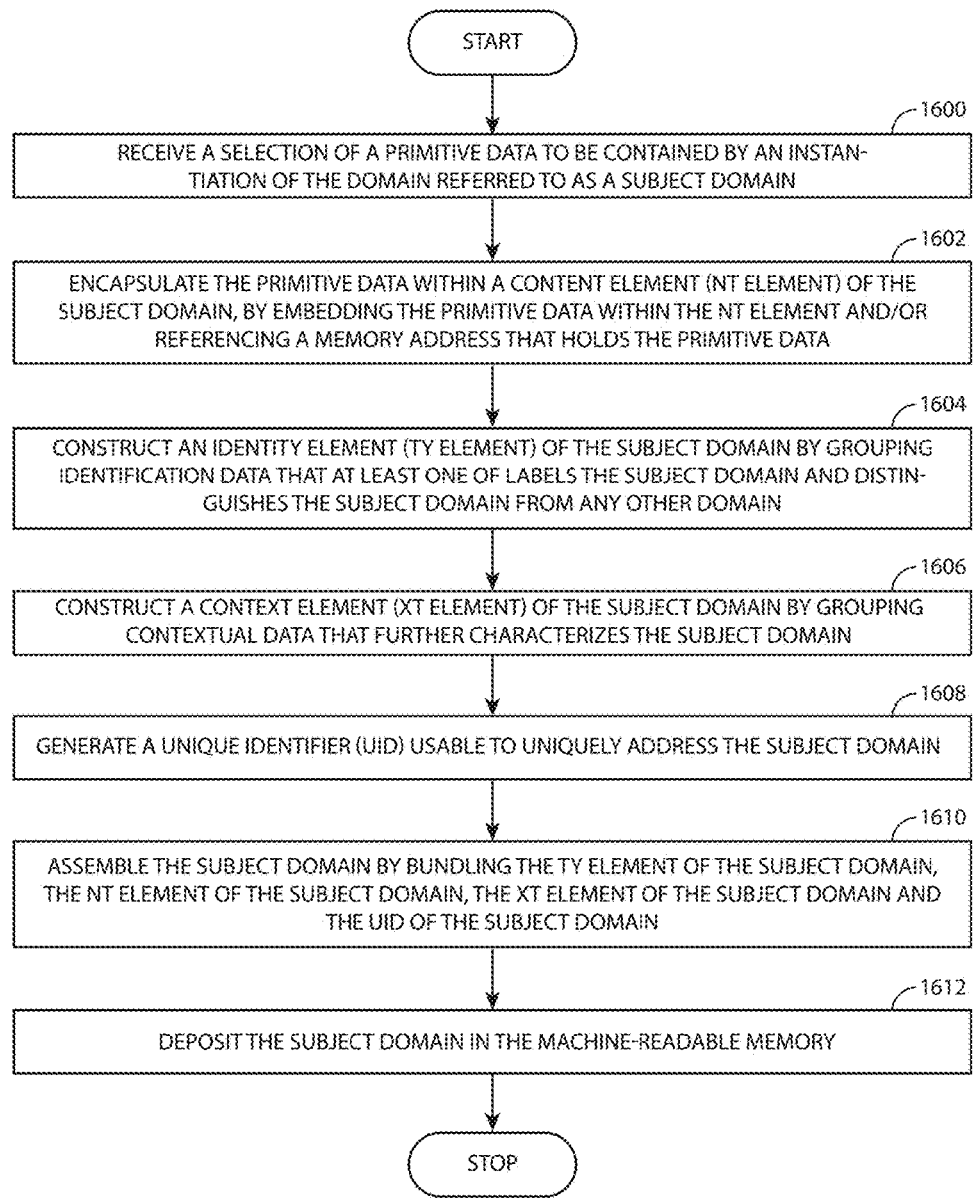
FIG. 16  Subject Domain Creation Process Flow 1650

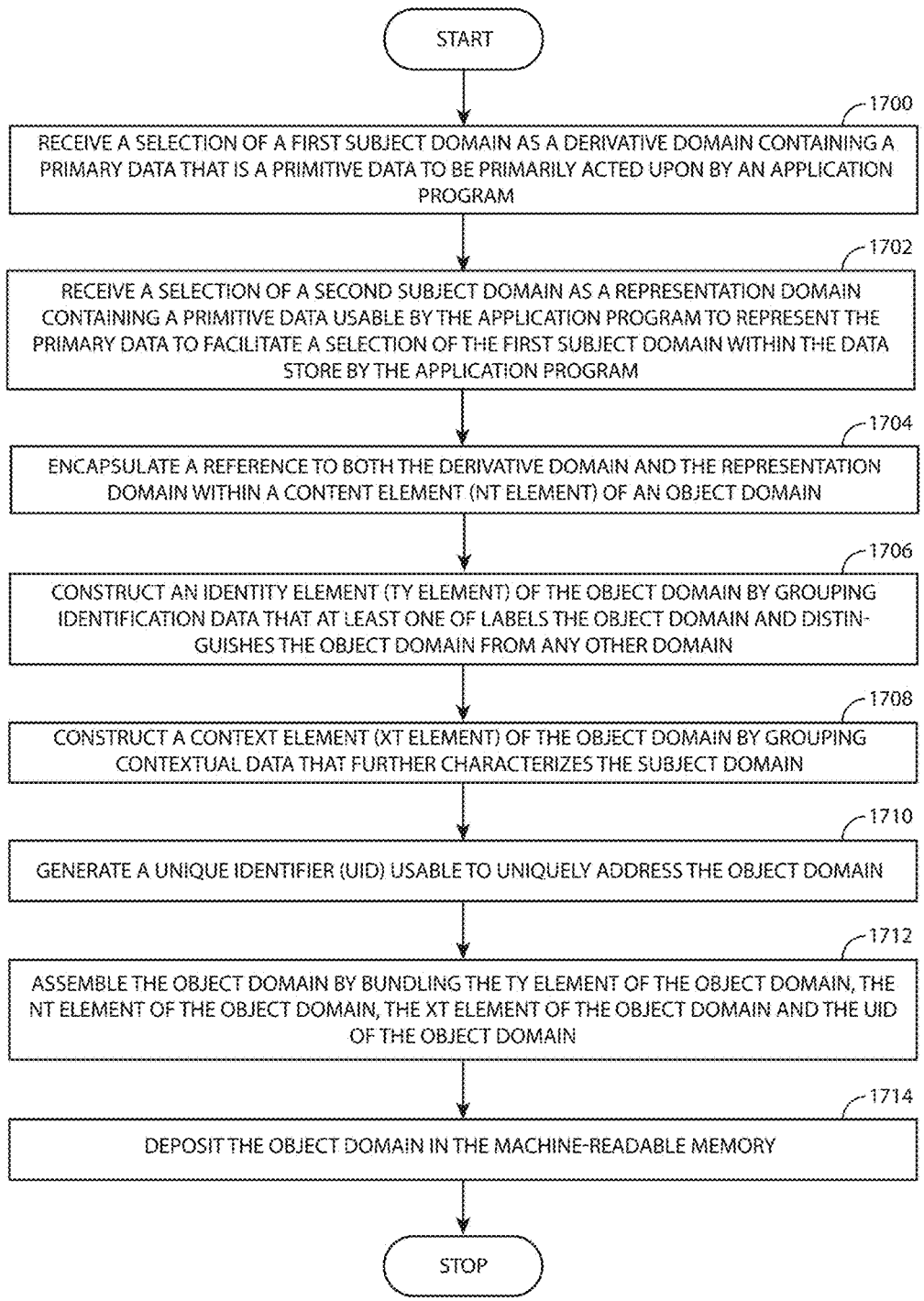
FIG. 17 — Object Domain Creation Process Flow 1750

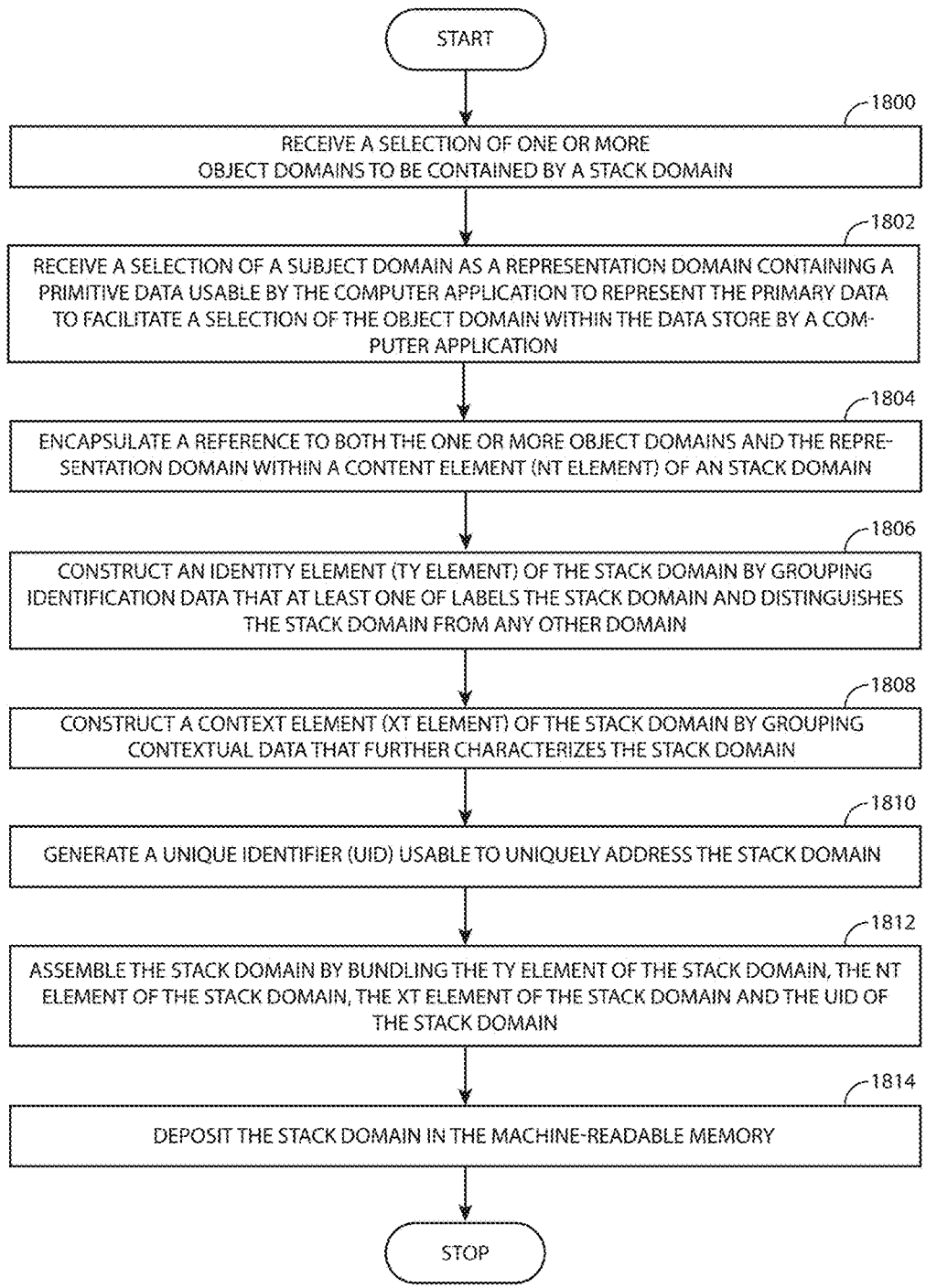
FIG. 18 — Stack Domain Creation Process Flow 1850

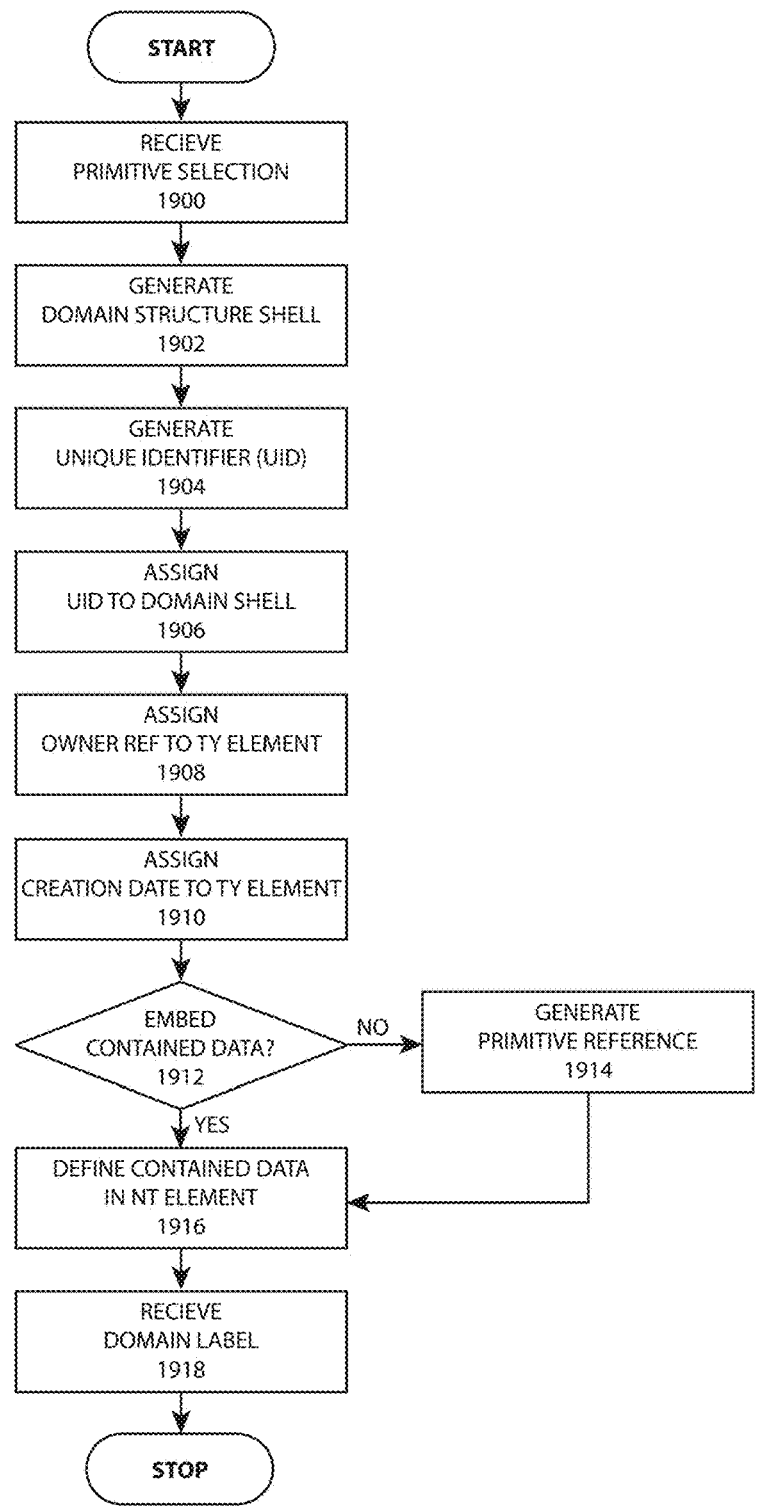
FIG. 19  Subject Domain Creation Process Flow 1950

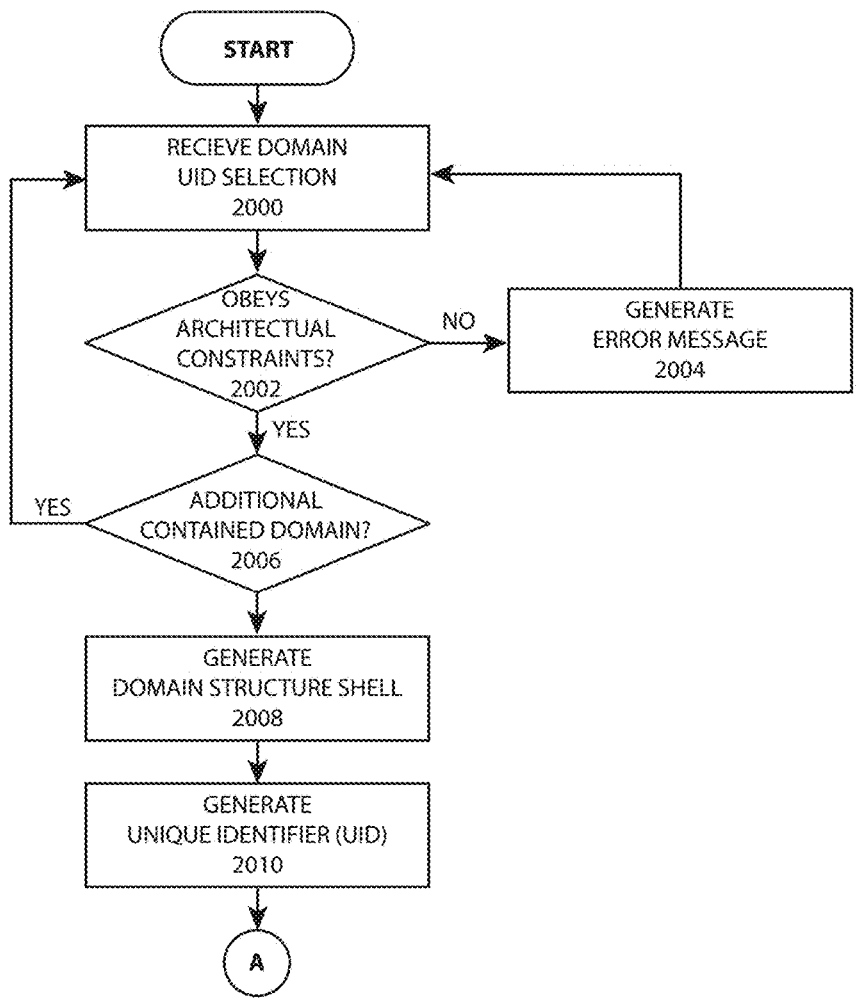
FIG. 20A  Relation Domain Creation Process Flow 2050

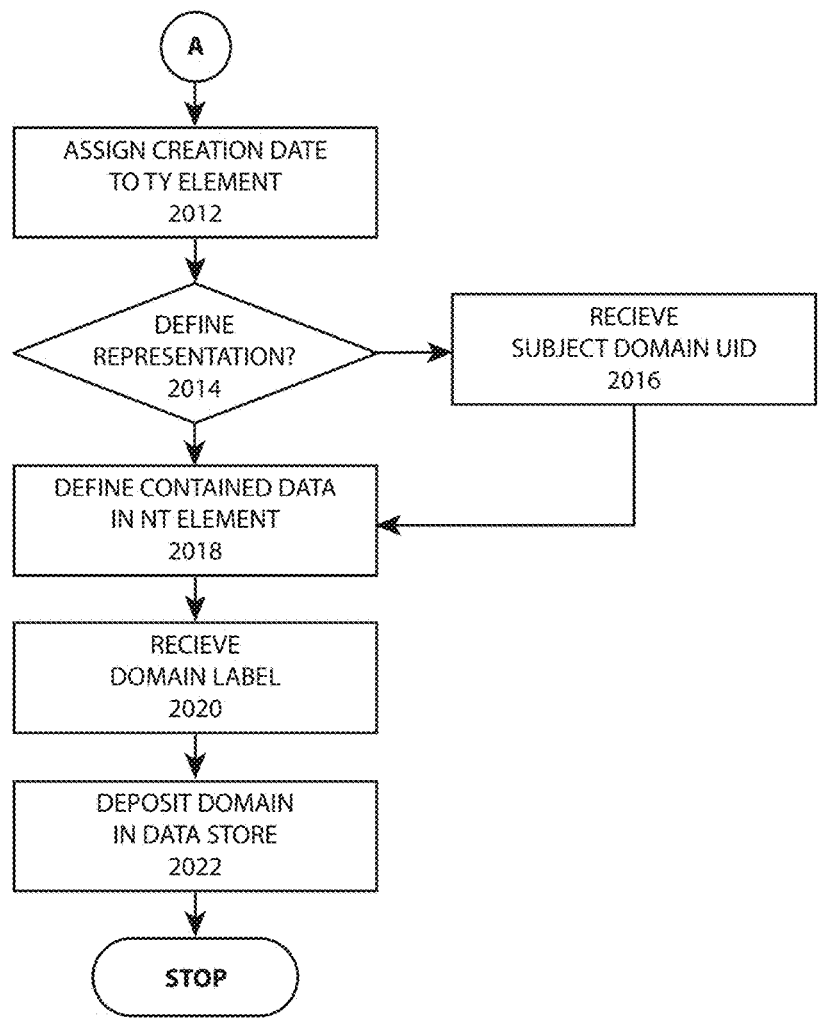
FIG. 20B  Relation Domain Creation Process Flow 2050

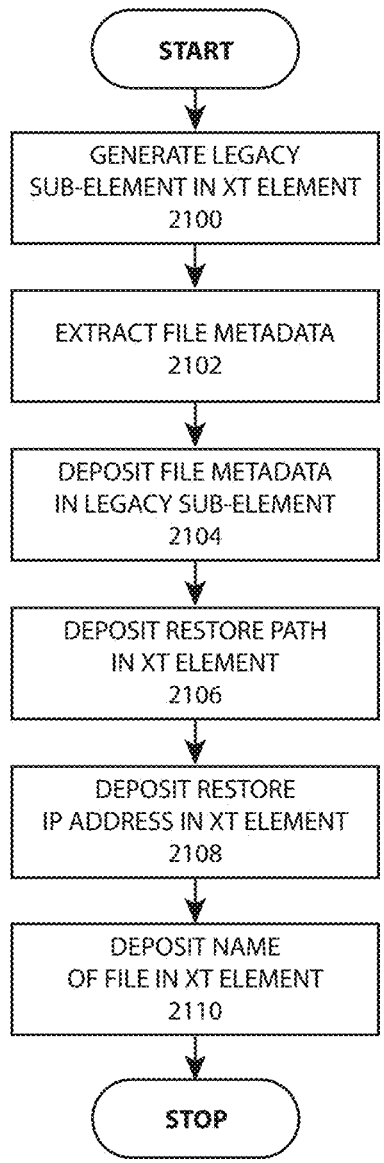
*FIG. 21*  Domain Structure Legacy Archive Process Flow 2150

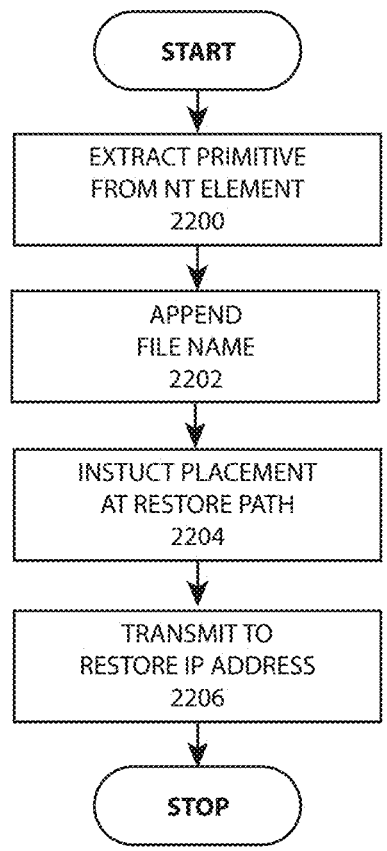
*FIG. 22*   Legacy Archive File Reconstruction Process Flow 2250

SUBJECT DOMAIN 200A

| | UID | 6dhEV59D33mil1d3g38Fjenc722jMqe9 | |
|---|---|---|---|
| identity | Name | Soul_at_risk | |
| | Date_Created | 1344659392 UTC (GMT) | |
| | Date_Modified | 1344660112 UTC (GMT) | |
| | Owner | ownerID_lc9r49E2moR5IAA3nk1... | |
| content | Primitive_Ref | 1FFF54E0 | |
| context | Publishing_App | ownerID_8vN3czu80cnD28xmfC... | |
| | Total_Spins | 23450 | |
| | legacy | RestoreIP | 172.16.254.1 |
| | | RestorePath | C:/music/final.. |
| | | FileName | soul_at_risk |
| | | Metadata | 10011011010... |
| | application | Application | owner_UID_8v... |
| | | ArtistName | JohnnyRae |
| | | PublishDate | 1344532774 UTC |
| | | Title | Soul@Risk |
| | | Twitter | #mtSingle_234.. |
| | | BuyNowLink | https//musicst... |

FIG. 24A

OBJECT DOMAIN 700A (SINGLE 2312)

| | UID | d8es48wm390ssir7D3mX2DDfk672szM5 | |
|---|---|---|---|
| identity | Name | Soul_at_risk | |
| | Date_Created | 1344659601 UTC (GMT) | |
| | Date_Modified | 1344659601 UTC (GMT) | |
| | Owner | ownerID_lc9r49E2moR5IAA3nk1... | |
| content | Derive_Audio | subjectID_6dhEV59D33mil1d3g3.. | |
| | Representation | subjectID_548fJwm8w6wkfH725... | |
| context | Publishing_App | ownerID_8vN3czu80cnD28xmfC... | |
| | Artist_Name | JohnnyRae | |
| | application | Application | owner_UID_8v... |
| | | ArtistName | JohnnyRae |
| | | PublishDate | 1344532774 UTC |
| | | Title | Soul@Risk |
| | | Twitter | #mtSingle_234.. |
| | | BuyNowLink | https//musicst... |
| | | Played_Live | objectID_7Jd9.. |

FIG. 24B

SEMANTIC DATA STRUCTURE AND METHOD

CLAIM OF PRIORITY

This patent application claims priority from, and hereby incorporates by reference and claims priority from the entirety of the disclosures of the following cases and each of the cases on which they depend and further claim priority or incorporate by reference: U.S. Provisional patent application No. 62/019,363, titled 'Database Security and Access Control through a Semantic Data Model' filed on Jun. 30, 2014.

FIELD OF TECHNOLOGY

This disclosure relates generally to data processing devices and, more particularly, to a method, a device, a system and a manufacture of a semantic data structure.

BACKGROUND

A data processing system, such as one or more computer processors running an application program, has input data and output data ("I/O"). The inputs are often received from or returned to a physical storage device referred to as a memory. For example, the memory may be RAM (a random access memory), a disk (e.g., a hard drive), or a memristor (a memory-resistor). A repository of information stored as bits of data on one or more of the memories may be referred to as a datastore. The datastore may be used to store, manage, and distribute electronic data, and may store any of the data resources produced and/or utilized by an individual and/or an organization. The efficiency with which data can be addressed, retrieved, and stored on the memory, and the security of the information in the datastore, may be important to an organization such as an enterprise, a cloud computing platform or a social network.

To facilitate the I/O of a computer, data is stored in the memory according to a particular arrangement. A data model provides the framework for organizing and representing data. The data model may be viewed as a set of rules and/or constraints for the arrangement of the data that defines permissible data structures that are built within the physical storage device. A data structure may be seen as a physical implementation of a data model's logical organization, and the data structure occurs as physical interrelationships among stored bits of data in the memory. The data structure may determine how the data processing system can interact with the datastore, including how pieces of data can be deposited, queried, addressed, and/or retrieved.

The way in which data is added to or retrieved from the memory may directly relate to the efficiency of the data processing system. For example, the data structure may determine how much time and energy a computer must expend to write the piece of data to the memory (e.g., add information in an organized way to the datastore) or to find, read, and retrieve a specific set of data from the memory. In some cases, the storage and retrieval may be the slowest aspect of a computer process. As one of the elements working with the I/O, the data structure may therefore be a factor in increasing efficiency of the computer. For example, this may be true for computer servers that power the back-end of e-commerce websites, social networks, enterprise computer applications, content delivery networks, "big data" analytics, and cloud computing services. Sometimes spread over wide geographic areas, networks of computer servers holding a distributed datastore may have to handle thousands, millions, or even billions of users, each requiring unique data to be stored and retrieved at all times and in unpredictable spikes of activity.

Related to normal operational efficiency is analytical efficiency. The data structure may also determine what types of analysis can be conducted on information in the datastore without excessively taxing computing resources. The data structure may therefore determine what insight can be practically derived from the datastore. Such analysis may crucial to make key strategic business decisions, to maintain and expand the data processing system itself, or even as the primary product or service offered by an enterprise.

The data structure placed in the memory may also directly determine which controls can be defined over access to and/or use of information in the datastore. Attempting to control access or use of data may require additional read and write operations that can add significant overhead to the data processing system. The data structure may therefore practically determine what security features can be implemented in a system having a large number of users.

A file system stores data according to a data model in discrete chunks referred to as "files." Some file systems may be organized according to a hierarchical data model that may limit how a file can be stored, retrieved and controlled. For example, an entire leg of a hierarchical data structure, often represented by cascading series of directories, may need to be analyzed by a computer in order to find a specific file. "Walking" these legs each time the specific file is requested may represent significant time and/or energy. The way in which a file is addressed within the hierarchical data structure, which may be through use of a "file path," may also cause application programs dependent on the file to break if the file is moved to a new leg of the hierarchy. Similar breakage may occur when an intermediate directory along the path between the root of the hierarchy and the file is deleted. Thus, addressability of a piece of data within the hierarchy may be associated with a taxonomy (e.g., how directories are organized) and a namespace (e.g., how directories are named or labeled). This dependence on locality may lead to repeated copying of a file to ensure it remains addressable, potentially leading to inconstancies between the original and the copy. Additionally, it may be difficult to represent non-hierarchical relationships between files and/or directories. A hierarchical file system may also attempt to control files with an external security system called an access control list. Under such an access control system, once a file is removed from the datastore its use and further dissemination may be beyond control of the file system and the organization that administers it.

A database may also be used to store data of a datastore. A particular database is comprised of a set of technologies that includes an application program that utilizes a particular data model to store data with and retrieve data from a datastore. For example, a database may include modules for processing a query language, buffering queries, and handling data recovery and security of the datastore. Databases may commonly store data at a finer granularity than a file system. A database may also be referred to as a database management system.

A relational database uses a relational data model comprising tables having sets of rows and columns. The resulting data structure within the memory may be relatively rigid, and may require foresight as to what information will be stored so that expectant tables can be set up ahead of data entry. Relationships between pieces of data within a relational database may need to be defined programmatically, that is, within the software code of the application program making use of the data. Defining relationships programmatically may increase time and energy required to store, retrieve and process information, and may make it difficult to determine relationships between data resources when examining the datastore. Relational databases may have similar access controls to a file system. Relational databases may also have difficulty when operating as part of a distributed datastore, for example by intolerance of network partitions that temporarily segregate two parts of the datastore.

Another class of databases are "NoSQL" databases, which may have been developed as an alternative to traditional relational databases and designed for use over distributed networks. The data models employed by NoSQL databases vary, and may include a column model, a key-value store, a document model, and/or an entity-attribute-value model. Some of these models are implemented "on top of" others. For example, some commercial databases implement a document model on top of a key-value store.

However, data models employed by NoSQL databases may be relatively under-defined. Some NoSQL databases are even referred to as "schemaless." For example, a dearth of organizational definition may mean that data structures within the memory may have no consistent format and/or organization, which may result in extra time and energy to address, retrieve and/or analyze data. Additionally, two distinct datastores utilizing the same data model (e.g., a document model) may arrange data within the limited rules of the model differently and may prevent the two datastores from being readily compared. "Big data" tools (e.g., MapReduce) may be used in an attempt to resolve data structure discrepancies but may require significant storage and computing resources.

Current data structures may result in a relatively large expenditure of time and energy by the data processing system, unnecessary duplication of data, limited analysis, and limits on the form of security and control that can be placed on information within a datastore. These inefficiencies can impact an organization, especially as the organization attempts to scale a network of computers to meet rising storage and computational demand. Not only may the costs of electricity, bandwidth and hardware increase faster than revenue, but inefficiencies may cause a file system, a database, or an application program to slow or crash, including those that power internet-scale businesses. The commercial transactions that the data processing system would otherwise have conducted may represent thousands or millions of dollars in lost revenue. Experiencing sluggish or intermittent service, users may leave for competing services.

To lower transactional costs organizations may be forced to adopt multiple databases or file systems for different aspects of their organization, each of which may employ a different data model. Translating data between databases and/or data models may impart its own set of inefficiencies (e.g., impedance mismatch) and such systems may constrain future development due to increased complexity.

SUMMARY

Disclosed are a method, a device, a system, and/or a manufacture of a semantic data structure. The semantic data structure is placed on a physical memory that is usable to store information within a datastore. The semantic data structure may model almost any real-world object and/or thing and the relationships between those objects and/or things. The semantic data structure provides a consistent framework for modeling data while remaining flexible and easy to learn.

In one embodiment, the semantic data structure in the memory includes a number of domains each organizing data into a domain structure. The domain structure includes a unique identifier (UID), whereby a particular domain is uniquely addressable within the datastore, and an identity element (TY element) comprising a first set of attribute-value pairs that include identification data usable to label the particular domain and/or distinguish the particular domain from any other domain within the datastore. The domain structure also includes a content element (NT element) that comprises a second set of attribute-value pairs that include contained data that the particular domain contains. The domain structure also includes a context element (XT element) comprising a third set of attribute-value pairs. The third set of attribute-value pairs include contextual data that further characterizes the particular domain.

Instantiations of the domain structures may be defined within the memory to serve particular functions. At least one of the number of domains in the data structure may be a fundamental instantiation of the domain structure referred to as a subject domain. The subject domain is defined by the contained data of the subject domain being a primitive data that is embedded in the NT element and/or referenced through a reference to one or more memory addresses containing the primitive data. Another of the number of domains may be a relational instantiation of the domain structure referred to as a relation domain. The relation domain is defined by the contained data of the relation domain including one or more references to each of one or more other domains.

Additional structure may be defined between and among the domains. A set of relation domains may model a set of containing relationships using a directed acyclic graph (DAG) architecture. To define the DAG architecture, each NT element of each of the relation domains may be a vertex of the DAG and each the references within the contained data of each of the set of relation domains may be a directed edge of the DAG architecture. However, while including some relatively rigid structures such as the DAG architecture, one or more of the number of domains may also model contextual relationships that may be more flexible by including within the contextual data unconstrained references to any other domain.

At least one of the domains may be an owner instantiation of the domain structure referred to as an owner domain. The owner domain references each domain owned by the owner domain. The identification data of the each of the domains that is owned by the instance of the owner domain includes a reference to the instance of the owner domain. In one configuration, each domain may be owned by one and only one instance of the owner domain. The owner domain may include two further instantiations: first, a user instantiation of the owner domain that represents an owner that is a person; and second, a machine-user instantiation of the owner domain that represents an owner that is an application program.

Additional structure may be defined between and among the domains by further instantiating the relation domain. An object instantiation of the relation domain referred to as an object domain is defined by the contained data of the object domain comprising a reference to each of one or more subject domains. A stack instantiation of the relation domain referred to as the stack domain is defined by the contained data of the stack domain comprising a reference to each of two or more object domains. Similarly, a collection instantiation of the relation domain referred to as a collection domain is defined by the contained data of the collection domain comprising a reference to each of two or more stack domains.

The domain structure may also include relationships between one domain containing data to be primarily acted upon by an application program (e.g, a "derivative domain") and another domain that represents the data to be primarily acted upon (e.g., a "representation domain"). For example, the contained data of the object domain may further include a reference to a first instance of the subject domain and a second instance of the subject domain. The first instance may include a contained data to be primarily acted upon by an application program (e.g., a 3D computer aided design file) and the second instance may be usable by the application program to represent the first instance (e.g., a image). The second instance, therefore, may facilitate a selection of the data to be primarily acted upon by the application program.

The derivative domain and representation domain may be used in conjunction with various instantiations of the relation domain. For example, the contained data of the stack domain may further include a reference to an instance of the subject domain usable by one or more application programs to represent the contained data of the stack domain. Similarly, the contained data of the collection domain may include a reference to an instance of the subject domain usable by one or more application programs to represent the contained data of the collection domain.

The identification data usable to label and/or distinguish the particular domain may include a reference to an instance of the owner domain that owns the particular domain, a name of the domain, an alphanumeric string that labels the domain, a unique property of the particular domain, and a unique relation of the particular domain. In addition, the identification data may also include a property with a low occurrence within the datastore, a relation with a low occurrence within the datastore, and a time stamp of at least one of a time the particular domain was created and a time the particular domain was modified. The primitive data (e.g., contained by the subject domain) may be a binary encoded text, an alphanumeric string, a number, a media file, a binary large object (BLOB), an audio file, a video file, a text file, a file of any MIME type, a cryptographic key, and/or a document.

The contextual data may include a characteristic, a color, a physical property, a state, a version, a description of the particular domain, a non-containing relationship to another domain within the datastore, a use for the particular domain, a location, and/or an example of the particular domain. The contextual data may also comprise application-specific data associated with an application program for which the one or more of the number of domains is an application resource.

One or more of the domains may be a security instantiation of the domain structure referred to as a security domain. The security domain may protect at least one instance of the domain that is referred to as a shielded. The security domain may include at a set of control values and/or a control algorithm, both of which are associated with a control policy defining an authorized context for use of data within the shielded domain. In one or more embodiments, a relation domain may reference the security domain and at least a portion of the contained data of the relation domain may be removed from the NT element of the relation domain and placed in the NT element of the security domain. Thus, a traversal of the data structure from the relation domain to a different domain it originally referenced may be required to move through the security domain, according to one or more embodiments.

The control algorithm includes one or more conditionals each accepting as an input at least one of the set of control values and at least one outside values that is from outside of the security domain. The set of control values includes a location of a device, a geospatial coordinate of the device, a type of the device, an operating system of the device, an application program, a query time, a query date, a number of uses of data of the shielded domain, a type of use of data of the shielded domain, a number of accesses of data of the shielded domain, a duration of use of the data within the shielded domain by one or more application programs, and/or an identifier of a user.

BRIEF DESCRIPTION OF THE DRAWINGS

The embodiments of this disclosure are illustrated by way of example and not limitation in the figures of the accompanying drawings, in which like references indicate similar elements and in which:

FIG. 1D is a representation of the domain of FIG. 1A built on top of a document store, shown in JSON notation, according to one or more embodiments.

FIG. 1E is a specific example of an entity-attribute-value (EAV) representation of the domain 100 of FIG. 1A comprising data related to an amino acid sequence of a human lysozyme enzyme, according to one or more embodiments.

FIG. 1F is a key comprising symbols that may be used in the present drawings to help describe instantiations of the domain of FIG. 1A and other embodiments.

FIG. 14 is a domain map that shows instantiations of the domains 100 of FIG. 1A graphically organized for presentation on a user interface, according to one or more embodiments.

FIG. 15 is a domain creation process flow that illustrates a process by which an application program such as a database can construct a data structure defined by the domain of FIG. 1A within a memory, according to one or more embodiments.

FIG. 16 is a subject domain creation process flow that illustrates a process by which an application program can construct the subject domain of FIG. 2 within a memory, according to one or more embodiments.

FIG. 17 is an object domain creation process flow that illustrates a process by which an application program can construct the object domain of FIG. 7 within a memory, according to one or more embodiments.

FIG. 18 is a stack domain creation process flow that illustrates a process by which an application program can construct the stack domain of FIG. 8, and similarly the collection domain of FIG. 9, within a memory, according to one or more embodiments.

FIG. 19 is a subject domain creation process flow that shows a detailed process that may be used for building the subject domain of FIG. 2 by the process of FIG. 16, according to one or more embodiments.

FIGS. 20A and 20B are a relation domain creation process flow that shows a detailed process that may be used for building the relation domain of FIG. 3 by the process of FIG. 15, FIG. 17, and/or FIG. 18, according to one or more embodiments.

FIG. 21 is a legacy archive process flow showing a process by which data stored in a different data model, such as a file stored in a hierarchical file system, may have metadata and origin data organized into a legacy sub-element within the XT element of the subject domain, according to one or more embodiments.

FIG. 22 is a legacy file reconstruction process flow showing how data within the legacy sub-element can be used to reconstitute the original file and return it to its original location, according to one or more embodiments.

FIG. 24A is an example of music data that can be stored within the subject domain of FIG. 23 shown in the entity-attribute-value representation of FIG. 1E, according to one or more embodiments.

FIG. 24B is an example of the music data that could be within the object domain of FIG. 23 shown in the entity-attribute-value representation of FIG. 1E, according to one or more embodiments.

Other features of the present embodiments will be apparent from the accompanying drawings and from the detailed description that follows.

DETAILED DESCRIPTION

Disclosed are a method, a device, a system and/or a manufacture of a semantic data structure. Although the present embodiments have been described with reference to specific example embodiments, it will be evident that various modifications and changes may be made to these embodiments without departing from the broader spirit and scope of the various embodiments.

Figure 1A:
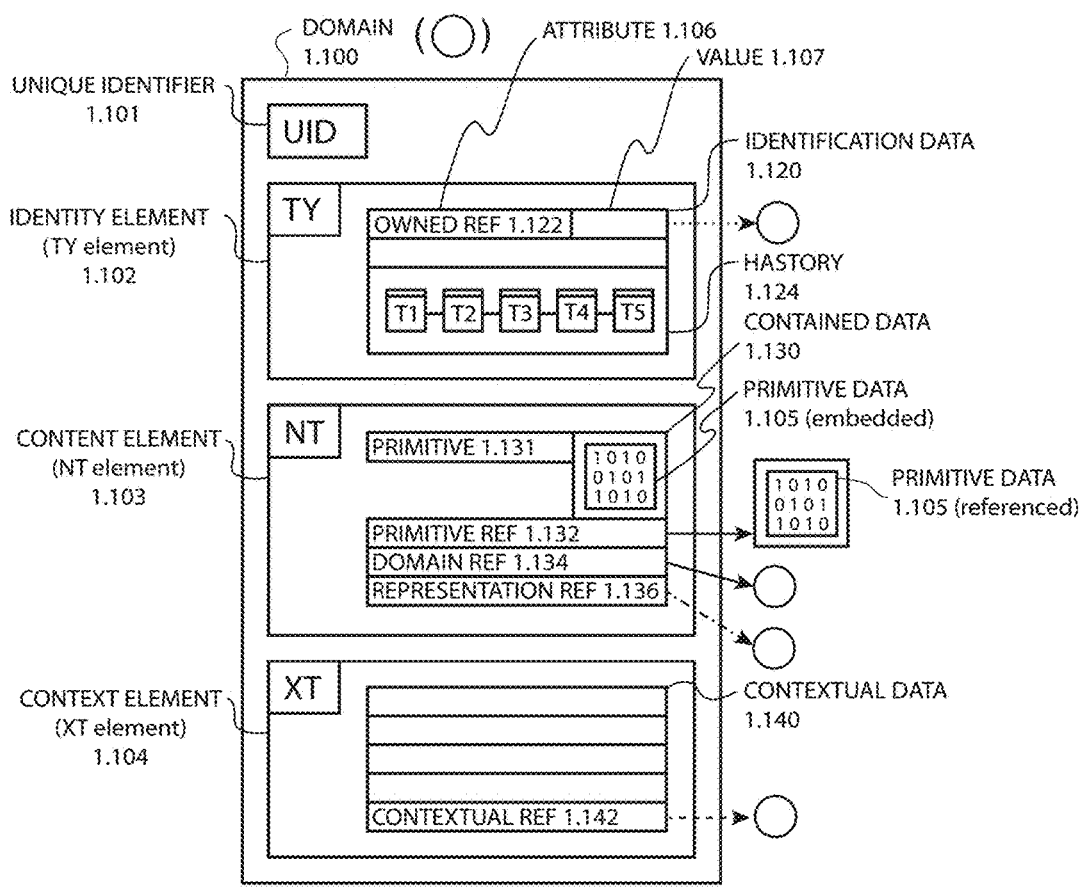
FIG. 1A is a domain comprising a unique identifier (UID), an identity element (TY element), a content element (NT element), and a context element (XT element), the domain and each of the elements of the domain organizing data and relationships into a specific structure, according to one or more embodiments. A circle within the present drawings may represent an instance of the domain of any instantiation.
Figure 2:
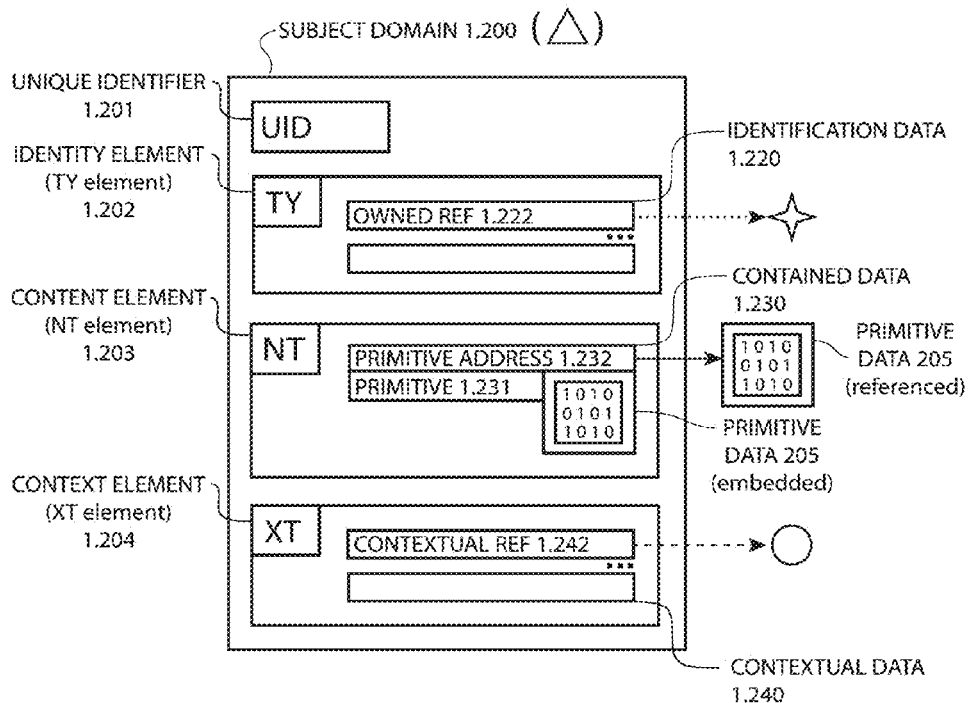
FIG. 2 illustrates a fundamental instantiation of the domain of FIG. 1A referred to as a subject domain, the subject domain defining a data structure that contains a primitive data that is embedded and/or referenced through the NT element, according to one or more embodiments. A triangle within the present drawings may represent an instance of the subject domain.
Figure 3:
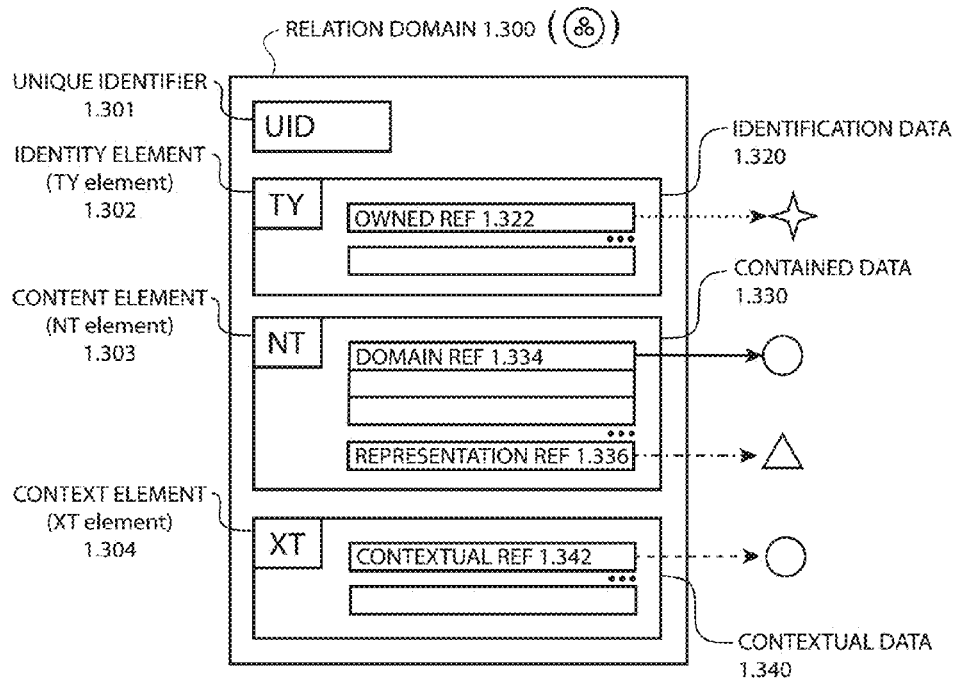
FIG. 3 illustrates a relational instantiation of the domain of FIG. 1A referred to as a relation domain, the relation domain defining relationships between one or more other domains that may include constrained relationships through the NT element and unconstrained contextual relationships through the XT element, according to one or more embodiments. A circle enclosing three smaller circles within the present drawings may represent an instance of the relation domain.
Figure 4:
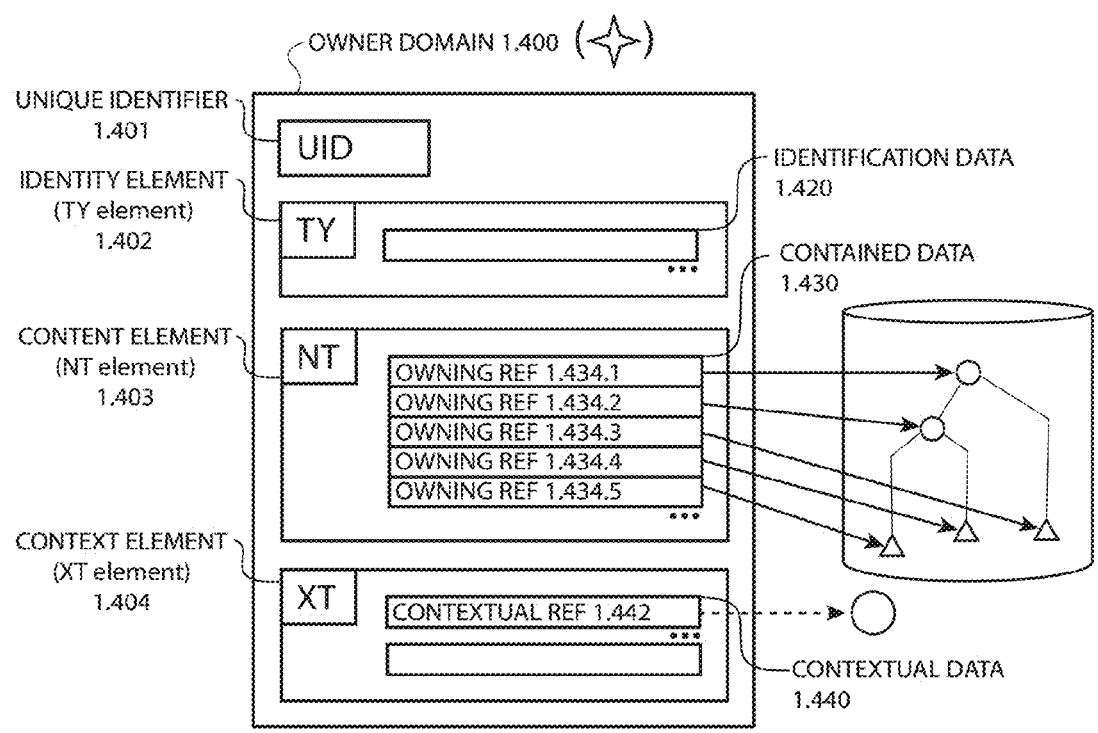
FIG. 4 illustrates an owner instantiation of the domain of FIG. 1A referred to as an owner domain, the owner domain representing an owner that is a person or an owner that is a machine and referencing each domain owned by the owner domain through the NT element, according to one or more embodiments. A four-pointed star within the present drawings may represent an instance of the owner domain.
Figure 5:
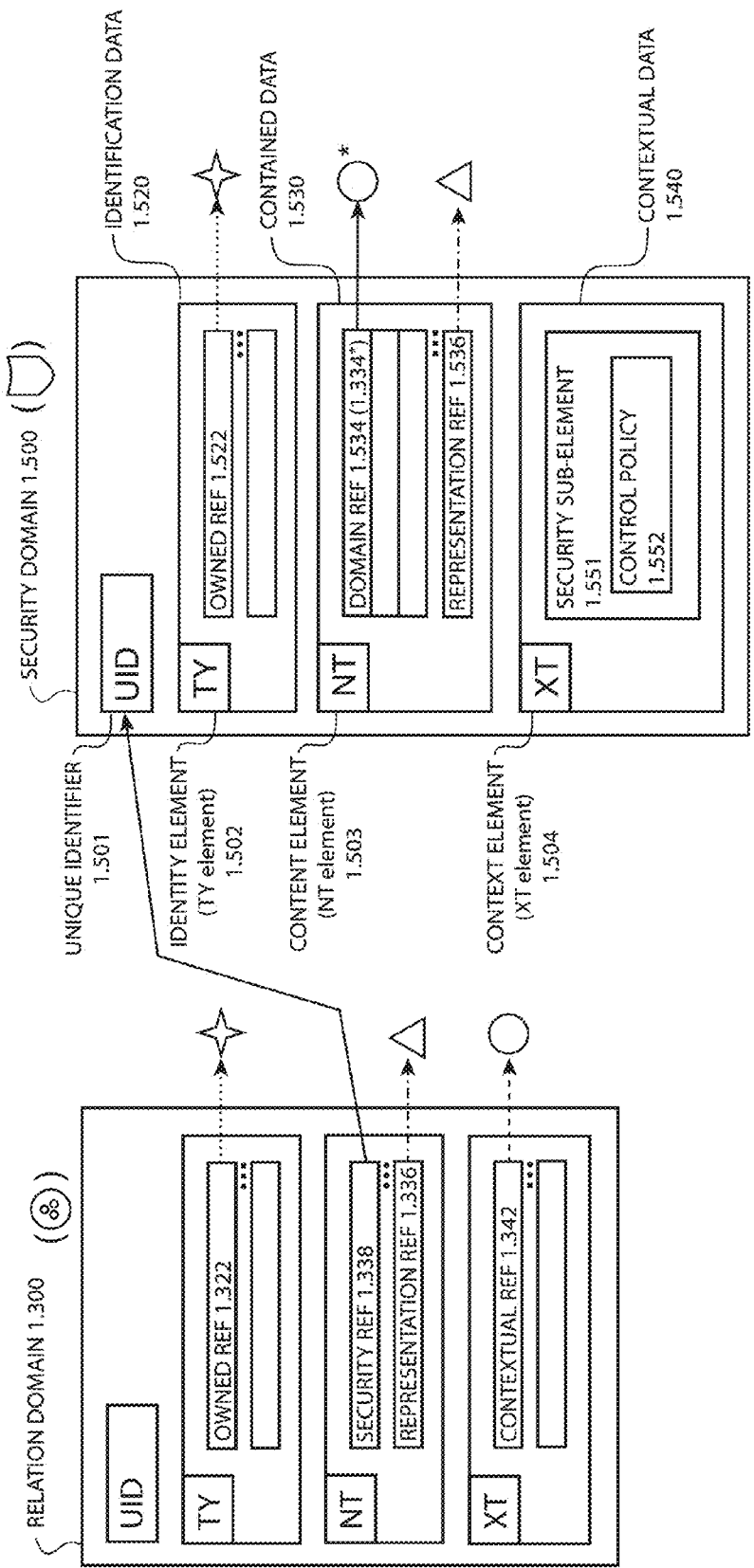
FIG. 5 illustrates a security instantiation of the domain of FIG. 1A referred to as a security domain, the security domain including a control policy usable to secure access to and/or use of data within the security domain itself and/or within a different domain referenced by the security domain, according to one or more embodiments. A shield icon within the present drawings may represent an instance of the security domain and an asterisk may represent an instance of the domain that includes data subject to the control policy referred to as a shielded domain.

FIG. 1A shows a domain 100 that defines a semantic data structure, according to one or more embodiments. A datastore may be comprised of data stored and organized in one or more instances of the domain 100. Each domain 100 may be used to model a real-world object or "thing," for example a file (such as a document, an audio track, an image, or a DNA sequence), a message, a user (such as a person or machine), a log file, or even a relationship between pieces of data. The datastore may be comprised of instantiations of the domain 100 that are adapted to model a particular type of real-world object or thing and/or to store a specific kind of data. For example, a subject domain 200, shown and described in conjunction with FIG. 2, is a fundamental instantiation of the domain 100 that can contain a piece of "subject" data usable by an application program as a data resource. The subject domain 200 can contain, for example, an audio file, a video file, a piece of clinical data, a scientific dataset, a message, or an architectural rendering. FIG. 3 shows another example of an instantiation of the domain 100, called a relation domain 300. The relation domain 300 can be used to draw relationships between domains 100. Similarly, FIG. 4 shows an instantiation of the domain 100 that can be used to represent a user of the datastore 100 and FIG. 5 shows an instantiation of the domain 100 that may be used to store data of a control policy 552 usable by an application program (such as a database) to limit access to, or use of, data within the datastore. A circle within the present drawings may represent an instance domain 100 of any instantiation.

The domain 100 may be comprised of a unique identifier 101 (which may be referred to as the UID 101) and three primary elements: an identity element 102 (which may be referred to as the TY element 102), a content element 103 (which may be referred to as the NT element 103), and a context element 104 (which may be referred to as the XT element 104). The primary elements may be referred to collectively as "the elements", or individually as "an element". Each of the elements organize data into a particular arrangement based on properties and/or characteristics of the data, for example whether the data is usable to identify the domain 100, whether the data is contained by the domain 100, or whether the data may help establish a context for the use of the domain 100. Each of the elements may hold data using one or more attribute-value pairs, each pair made up of an attribute 106 and a value 107. A field for each value 107 may be set to a common data type, for example a float, an integer, an alphanumeric string, or a binary large object (BLOB). The attributes 106 may establish structure between and among the domains 100. Throughout this disclosure including the accompanying figures, "ref" is used as an abbreviation for a reference (e.g., a referential attribute and value). References are usually drawn from one domain 100 to another domain 100. FIG. 1A shows a few common attributes 106 that may be used within the domain 100, including: an owned ref 122, a primitive 131, a primitive ref 132, a domain ref 134, a representation ref 136 and a contextual ref 142. For clarity, the attributes 106 of the present embodiments are generally shown in the figures without associated values 107. Additionally, aspects of the various embodiments that comprise attributes 106 and values 107, being evident to one skilled in the art, are generally unlabeled in the drawings and accompanying text after the embodiments of FIG. 1A through FIG. 1E.

Each element of the domain 100 is comprised of a specific set of data that may improve storage and query efficiency through uniform syntax and semantics. The unique identifier 101 allows the domain 100 to be uniquely addressable within the datastore. The UID 101 may be a value 107 with a low or very low likelihood of occurring twice within the same datastore. For example, the UID 101 may be a string of random alphanumeric characters thirty or more in length. In one preferred embodiment the UID 101 is a globally unique identifier such that each domain 100 is likely to remain unique when compared to domains 100 within any other datastore, even a datastore operated by a different organization. In another preferred embodiment an attribute 106 that references an instance of a different domain 100 (e.g., owned ref 122, domain ref 134) may have a value 107 that is the UID 101 of a different domain 100. Use of the UID 101 as a value 107 may allow an application program to directly address the different domain 100.

The TY element 102 comprises identification data 120 usable to either label a particular domain 100 or distinguish the particular domain 100 from any other domain 100 within the datastore. For example, data within the identity element 102 may be used by an application program, or a person operating the application program, to identify the particular domain 100 and/or the data that the particular domain 100 contains. Data usable to label the domain 100 may be, for example, a name of the particular domain 100 that is either user-defined or automatically generated by an application program. For example, data usable to label the domain 100 may be "Stairway to Heaven" when the domain 100 contains an audio track, "IMG_00045" when the domain 100 contains a digital photo, or "2015-June_ClinicalTrials" when the domain 100 contains clinical test data.

The identification data 120 may also include data that is usable to distinguish the particular domain 100 from any other domain 100 within the datastore. This distinguishing data includes a unique property of the domain 100 or a unique relation of the particular domain 100. For example, where the domain 100 contains data related to a periodic table element, the identification data 120 may include a number of protons (recall that the number of protons unique determines a species of the chemical element such as fluorine, tin, or potassium). In another example, where the domain 100 contains data related to a chemical compound, the TY element 102 may include within the identification data 120 electromagnetic radiation absorption values that are unique to the chemical compound. The radiation absorption values may act as a signature sufficient for a chemist to identify the compound modeled by the domain 100. In general, attributes usable as a "primary key" in other data models (e.g., the relational data model) for a group of related data may also be used in the identification data 120.

The distinguishing data may also include data that is not unique within the datastore but which may generally have a low expected reoccurrence. For example, the distinguishing data may be a time stamp of a time at which the particular domain 100 was created and/or modified. Specifically, where domain 100 stores a report of oceanographic activity is made daily, a date may be the distinguishing data, whereas when the domain stores a real-time statistic generated by a stock trade the a time including a millisecond accuracy may be the distinguishing data. The distinguishing data may include attributes 106 that when considered in combination are usable to distinguish the particular domain 100 from any other domain 100 within the datastore. In other words, even where the value 107 of an attribute 106 within the identification data 120 is not likely unique within the datastore, the identification data 120 may be comprised of attributes 106 that, when a small number are examined in combination (e.g., two, three), can be used to identify the particular domain 100. For example, it is possible that neither the time stamp nor the owner are used by an application program to label the particular domain 100, but the combination of the owner and the time stamp is used to identify the particular domain 100 by distinguishing it from any other domain within the datastore. Distinguishing data may also be a property with a low occurrence within the datastore and/or a relation with a low occurrence within the datastore. For example, a domain 100 modeling a person could have a unique relation to a different domain 100 modeling a biological father of the person (perhaps through a "bio_father" attribute 106 within the identification data 120). The role and use of the identity element 102 is further described in conjunction with FIG. 1E.

The hastory 124 is a hashed history of transaction records, each transaction record related to one or more transactions in which the domain and/or data of the participated (e.g., the primitive 131) participated. The hastory may create a "controlled identity" of the domain 100 within the datastore based on an immutable chain of blocks (the chain of blocks is shown in FIG. 1 as five illustrative transaction records, T1 through T5). The hastory 124 may include a set of blocks in a sequential chain and each block of the set of blocks includes a transaction record of a set of previous transactions. A hash function may generate a hash value of each block using inputs comprising a previous hash value of a previous block along with a transaction record of a present block. A root hash that is unique within the datastore results, the root hash dependent on a given data within each of the blocks and a given block order of the sequential chain. The hash function may be a cryptographic function and/or algorithm that converts a set of data to a string of other data such as alphanumeric characters. Additionally, the hash function may be a function that can be used to map digital data of arbitrary size to digital data of fixed size, where a small change in the input digital data yields a large difference in the output digital data of fixed size. The hastory may be implemented as a Merkle tree, a hash chain, and/or a hash list.

A first block of the sequential chain may be a genesis block initiating the hastory. For example, where for the user domain 400, the genesis block 2.303A may contain a transaction record that includes data one or more attribute-value pairs of the TY element, such as an email address, biometric information, or name. After the domain 100 having the hastory participates in an interaction, for example with an application program and/or a different domain 100 within the datastore, a new transaction record may be generated. The transaction record may be deposited as a new block in the sequential chain of blocks of the hastory. The root hash of the hastory may then be re-calculated with a hash function (e.g., SHA256 algorithm), where the hash function uses inputs that include the new block of the hastory of the particular domain 100. As a result, the controlled identity of the domain 100 evolves and can be distinguished from a copy of the domain 100 that includes otherwise similar data but which has a different transaction history. Thus, the evolved domain 100 may remain unique within the datastore, may have a complete auditing record of transactions in which it participated.

Retention of uniqueness within a datastore may allow a data processing system to define processes that distinguish otherwise identity domains 100. For example, a method may then be used to effect a controlled copying of the domain 100 such that a distinct original and copy are specified. Similarly, ownership may be determined and transferred in a distinct set of bits that comprise an instance of the domain 100. Further use of the hastory may be shown and described in conjunction with co-pending patents and/or patent applications by similar inventive entity and/or common assignees of the present embodiments.

The NT element 103 comprises contained data 130 that the particular domain 100 contains. The data within the contained data 130 may be physically and/or logically contained as a logical "containing" relationship (e.g., a domain 100 that specifies an industrial part that is an assembly wherein each. Data that is physically contained (which may also be referred to as "embedded data") may be proximate and/or directly associated with the data structure of the particular domain 100 within a physical storage device. For example, data that is physically contained by the domain 100 may be placed in a memory address adjacent to other memory addresses holding the data structure defined by the domain 100. Similarly, both the domain 100 and the contained data 130 could be placed on the same hard disk sector. On the other hand, data that is logically contained by the domain 100 may include a reference (e.g., the domain ref 134) to a physical location such as a memory address holding the data that is logically contained by the domain 100.

Where the particular domain 100 contains a fundamental piece of data within the datastore, the contained data 130 may be a primitive data 105. The primitive data 105 may be embedded within the particular domain 100 (shown in FIG. 1A as the primitive 131 attribute 106). For example, the value 107 of the primitive 131 attribute 106 may be a string when the domain 100 contains a message or a BLOB when the domain 100 contains an image file. The contained data 130 may also be a reference to a memory address containing the primitive data 105 (the reference to the memory address shown in FIG. 1A as the primitive ref 132 attribute). The reference to the memory address may also be known as a pointer. In one or more embodiments, a small instance of the primitive data 105 is embedded in the domain 100 (e.g., 140 alphanumeric characters, a DNA sequence of 3000 base pairs), whereas a large instance of the primitive data 105 is referenced through primitive ref 132 (e.g., an audio file, a genome).

Figure 6:
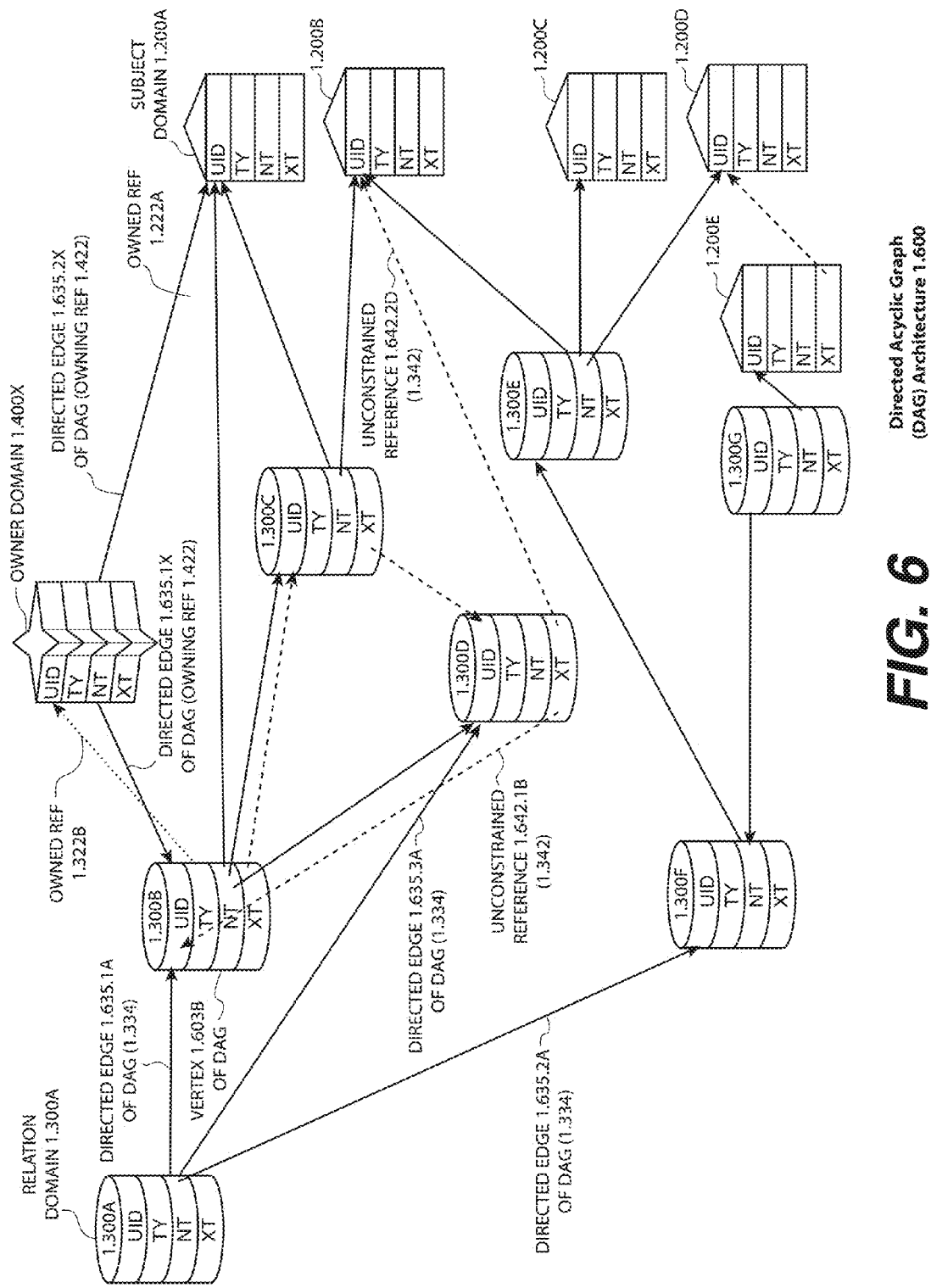
FIG. 6 illustrates a directed acyclic graph (DAG) architecture that imposes constraints on values of referential attributes within the NT element of the domain, while simultaneously permitting one or more unconstrained referential attributes within the XT element to allow for flexibility, according to one or more embodiments.

Rather than contain a primitive, the particular domain 100 may also contain a reference to one or more other domains 100 within the datastore (shown in FIG. 1A as the domain ref 134). An architectural constraint may be applied to one or more of the references such that the data structures built from instances of the domain 100 reference one another according to a particular arrangement. These architectural constraints may be used to build data structures that reflect and enforce certain types of relationships (such as a container) modeled through a directed acyclic graph (DAG) architecture 600, as shown in FIG. 6. An example of one set of architectural constraints is demonstrated in FIG. 7 through FIG. 11.

In addition to referencing an instance of the domain 100 through the domain ref 134, the particular domain 100 may reference a different instance of the domain 100 that represents and/or depicts the particular domain 100 (shown in FIG. 1A as the representation ref 136). The representation may help a user to make a selection of either the particular domain 100 or another instance of the domain 100 that the particular domain 100 contains. Representation domains that are instantiations of the domain 100 will be shown and described in conjunction with FIG. 11 and various other embodiments.

The particular domain 100 may contain within the content element 103 multiple instances of the primitive 131, primitive ref 132, domain ref 134, and/or representation ref 136. However, in one or more preferred embodiments the real-world objects modeled by the domain 100 are reduced to relatively basic units, and the instantiations of the domain 100 take on specialized roles reflecting the nature of these basic units. For example, the subject domain 200 of FIG. 2, in one or more preferred embodiments, contains within the NT element 203 a single primitive data (referred to in FIG. 2 as primitive data 205). Similarly, collection domain 900 of FIG. 9, according to one or more preferred embodiments, contains within the NT element 903 references to two or more stack domains 800. In such case the real-world thing that the collection domain 900 reflects may be the relationship itself between the two or more stack domains 800, thus expressing the relationship of the domains in the data structure rather than programmatically through software code that may attempt to build relationships as the code executes.

The XT element 104 comprises contextual data 140 that further characterizes the particular domain 100. The contextual data 140 may include examples of the particular domain 100 and/or data related to how the particular domain 100 is used. The XT element 104 may be a repository of any other data that is not primarily used to identify the domain 100 through the TY element 102 and that the domain 100 does not contain within the NT element 103. The XT element 104 may include attributes 106 having values 107 that have a relatively high likelihood occurring more than once within the datastore. For example, an attribute 106 "color" may have the value 107 "green." In this case, the value 107 green may be a likely property of many domains 100 within the datastore. The XT element 104 may include statistical data such as how many times data within the domain 100 has been accessed or used.

The XT element 104 may also include one or more context sub-elements. A legacy sub-element 144 may be used to store legacy information and metadata from an original file that was placed in the domain 100. An application sub-element may store data related to use of the domain 100 by one or more application programs. The XT element 104 and its optional sub-elements are further shown and described in conjunction with the example of FIG. 1E.

Figure 1B:
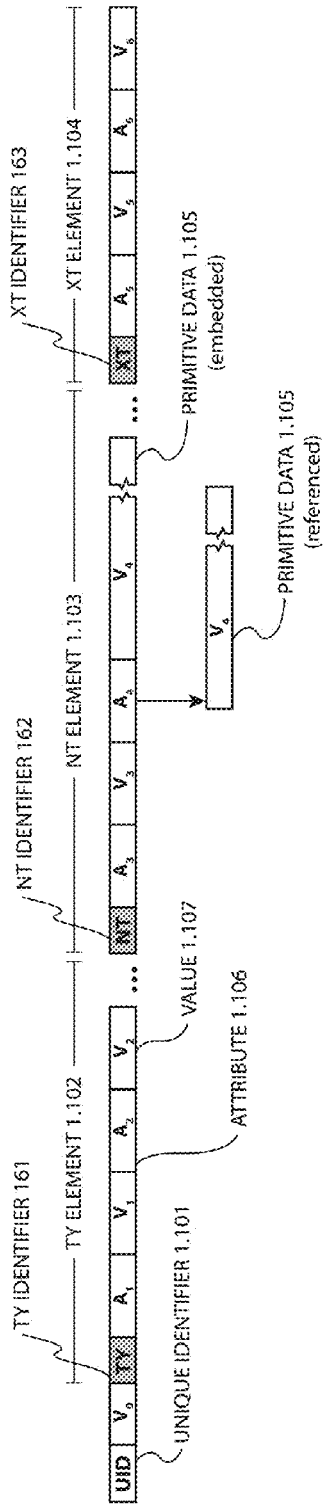
FIG. 1B is a representation of a linear memory storage of the domain of FIG. 1A, such as may be deposited directly in RAM and/or a memristor, according to one or more embodiments.

The data structure arranged according to the domain 100 may be deposited into the memory using a physical storage technology that may also be known as a physical layer and/or an internal schema. FIG. 1B is a representation of a linear memory storage of the domain of FIG. 1A, such as may be deposited directly in RAM and/or a memristor, according to one or more embodiments. Each element of the domain 100 may have an element identifier associated with one or more attribute-value pairs. For example, the TY identifier 161, the NT identifier 162, and the XT identifier 163 may signal the beginning of their respective elements within the memory. Although shown in a particular sequence (UID 101, TY element 102, NT element 103, and then XT element 104), the elements within an instance of the domain 100 may occur in any order (regardless of what storage layer the domain 100 is placed on). The primitive data 105, when referenced, may be stored at a memory address remote to the domain 100 stored in the linear memory. The primitive data 105, when embedded, may be deposited in association with the primitive 131 attribute (not shown in the embodiment of FIG. 1B) after the NT identifier 162. The linear memory may be a solid-state (SSD) drive. The linear memory may also be a memristor, also known as a "memory resistor." The linear memory may even be a physical storage device that stores information in quantum bits, also known as qubits.

Figure 1C:
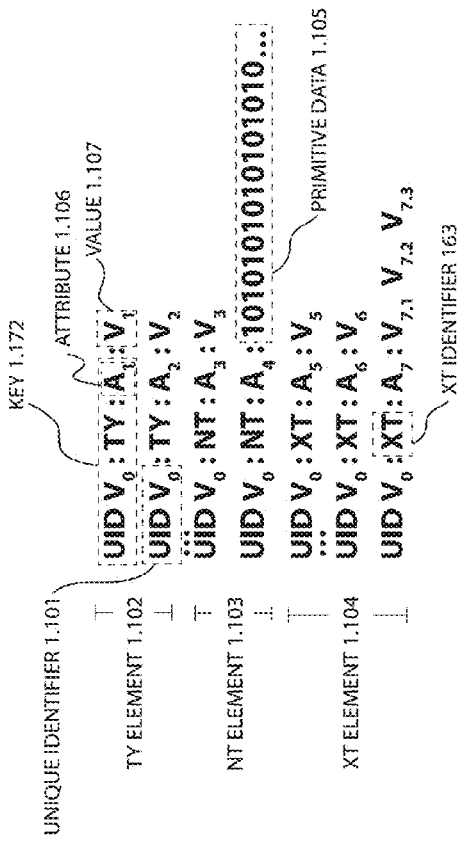
FIG. 1C is a representation of the domain of FIG. 1A built on top of a key-value store, according to one or more embodiments.

The data structure arranging data according to the domain 100 may also be deposited into the memory using a storage layer that employs a different data model, for example a key-value store or a document model. In this case the domain 100 is said to be stored "on top of" the different data model, and may use the rudimentary building blocks of the different data model to impose the organization of the domain 100 on data resident in the memory. For example, the domain 100 may be placed into memory on top of a storage layer utilizing a memory map or a hash table. In another example, FIG. 1C is a representation of the domain of FIG. 1A built on top of a key-value store, according to one or more embodiments. In FIG. 1C, each value 107 within the domain (e.g., a value of the UID 101, a value 107 of the domain ref 134) is matched with a key 172. Each key 172 may be comprised of the value of the UID 101 of the particular domain 100, along with an element identifier (e.g., TY identifier 161) and the attribute 106. As shown in FIG. 1C, the primitive data 105, when embedded within the domain 100 that is stored on a key-value store, may be stored as a BLOB. The key-value store may be an existing commercial database, such as Redis, Riak, DynamoDB, Encache, and/or Memcached. In one preferred embodiment, a commercial database able to support transactions (e.g., ACID compliance) is used.

FIG. 1D is a representation of the domain 100 of FIG. 1A built on top of a document store, shown in JSON notation, according to one or more embodiments. The unique identifier 101 may be represented as an attribute-value pair, whereas the TY element 102 may include a subset of attribute-value pairs (e.g., the owned ref 122 attribute 106 and an associated value 107). FIG. 1D also illustrates that a value 107 may be comprised of array of values (that may be referred to as values 107.1, 107.2, etc.). A database storing the document may be an existing commercial database, such as MongoDB.

FIG. 1E is a specific example of an entity-attribute-value (EAV) representation of the domain 100 of FIG. 1A comprising data related to an amino acid sequence of a human lysozyme enzyme, according to one or more embodiments. In the embodiment of FIG. 1E, The UID 101 is made up of one attribute 106 and one value 107. The TY element 102, the NT element 103, and the XT element 104 are comprised of entity-attribute-value triplets. The TY element 102, the NT element 103 and the XT element 104 are each an instance of an entity 182. Examples of an attribute 106 associated with the TY element 102 are: "name," "date created," and "owner." Examples of a value 107 associated with attributes are, respectively: the array that includes "lysozyme C" and "1,4-beta-N-acetylmuramidase C"; "1344532774 UTC (GMT)"; and the string beginning "owner_UID_kc73n" that is an instance of the UID 101 belonging to a different domain 101 that owns the domain 100 shown in FIG. 1E (e.g., an owner domain 400). In relation to FIG. 1A, The contained data 120 is comprised of the attributes 106 and values 107 of the TY element 102 of FIG. 1E.

The TY element 102, the NT element 103, and the XT element 104 may further include sub-elements. A section of the domain containing sub-elements, such as the legacy sub-element 144 and the application sub-elements 146.1 and 146.2, may be stored in what may be understood to be an entity-sub-entity-attribute-value "quadruplet." In one or more embodiments, the XT element 104 may include a legacy sub-element 144 comprising data about the origin of a file that has been placed into the domain 100 (e.g., a file removed from a hierarchical file system and placed in the domain 100). In one or more embodiments, the XT element 104 may include one or more application sub-elements (e.g., the application sub-element 146.1 and the application sub-elements 146.2) holding data that may be utilized by one or more application programs.

The specific domain 100 as shown in the embodiment of FIG. 1E is used to store data about an enzyme that is excreted by tear ducts of humans to inhibit bacterial growth in the eyes: human lysozyme C. In the embodiment of FIG. 1E, the UID 101 has a value of 32 random alphanumeric characters. The TY element 102 is made up of data that can be used to either label the domain 100 or distinguish the domain 100 from any other domain within the datastore, allowing a user to identify the domain 100 as containing lysozyme C data and/or modeling lysozyme C. Specifically, the name attribute 106 holds an array of values 107 that can identify the domain 100, a gene_code attribute 106 holds a common three-letter abbreviation of a human gene that codes for the lysozyme C enzyme, and a UniProtKB attribute 106 that holds a unique identification code that has been assigned to lysozyme C by a scientific organization. The weight attribute 106 having a value 107 of 16537 Daltons is an example of data that while perhaps not likely to have a unique value within a datastore holding enzyme information may still be unlikely to occur more than a few times. The weight attribute 106, in the embodiment of FIG. 1E, may therefore be usable to distinguish the domain 100 of FIG. 1E from any other instance of the domain 100 within the datastore.

The NT element 103 of FIG. 1E holds data that the domain 100 is considered to contain, in this case an amino acid sequence that makes up lysozyme C (the value 107 of the sequence attribute 106) and a list of disulfide bonds between the amino acid sequence (the value 107 of the disulfide attribute 106). In FIG. 1E, both the value 107 of both the sequence and the disulfide attributes 106 are embedded in the domain 100. The NT element 103 may also include a reference to a representation of the domain 100 to help enable a selection of the domain 100 of FIG. 1E through a user interface. For example, an application program may address the NT element 102 and display the representation on a graphical user interface before expending time and/or energy to access, transmit or display other data within the domain 100.

The XT element 104 of the domain 100 of FIG. 1E may be comprised of data that further characterizes the domain 100, for example an application program that added the domain 100 to the datastore (the publishing_app attribute 106) or a website related to and/or providing more information about an aspect of the particular domain 100. Additionally, the XT element 104 may contain data that characterizes use of the domain 100. For example, a substrate attribute 106 specifies a chemical compound that lysozyme C catalyzes (acts on), and an enzyme_class attribute includes the category of enzyme to which lysozyme C belongs.

The legacy sub-element 144 is used to store data related to where one or more pieces of the content data 130 came from. For example, where the an original file is uploaded remotely to be placed in an instance of the domain 100 (e.g., within the subject domain 200), a restoreIP attribute 106 shows an IP address that the original file arrived from, a restore path (e.g., from a hierarchical file system), a file name of the original file (which may have a different value 107 than the name attribute 106 of the TY element 102), and a metadata that may have been extracted and/or stripped from the original file. A process for creating the legacy sub-element 144 from the original file is shown in FIG. 21, and a reverse process for reconstructing the original file is shown in FIG. 22.

An application sub-element 146 may store data that is application-specific (e.g., particular to a specific application program). The attributes within each of the application sub-elements 146 may be similar or may differ widely between application sub-elements. For example, while both the sub-element 146.1 and the sub-element 146.2 have an app_data attribute 106 specifying an owner (e.g., the owner domain 400 of FIG. 4), they also comprise attributes 106 unique to the function of each application program. The application sub-element 146.1 includes application-specific data from an application program that sells research supplies to laboratories. The attribute Price_10 gm may be a price in dollars per ten grams of lysozyme C. In contrast, the application sub-element 146.2 is for an application program that maps biological origins of enzymes. A tax_lineage attribute is therefore used to store a taxonomy of a species from which the enzyme was isolated (in the case of lysozyme C, humans).

Arranging data according to one or more of the present embodiments may represent several advantages. First, each instantiation of the domain 100 has a uniform syntax and semantics, allowing developers of application programs to easily learn how to interact with a datastore and how to utilize the domain 100 as a data resource within the datastore and/or for utilization of the application program. The consistent syntax and semantics also allows a single instance of the domain 100 within the memory to be utilized as a data resource for several application programs. At the same time, developers are still afforded flexibility by being able to add and define custom attributes 106 within the application sub-element 146. This use of the domain 100 by multiple application programs reduces duplication of data, saving space in the memory (and potentially preventing consistency issues associated with copying the data resource to ensure it remains addressable). Additionally, the owner of the domain 100 simultaneously can regulate access to or use of the domain 100 by all of the application programs that utilize it as a data resource, creating a single point of control (e.g., with the security domain 500 of FIG. 5). This single point of control may make the domain 100 especially useful in storing and distributing licensable content, such as music, video, documents, or computer aided drafting (CAD) files. It also makes the domain 100 useful to transact in private communications, securely store resources, and for enterprise and/or government cyber security applications. All of these emergent properties of the domain 100 and/or the relations between domains may make a datastore defined by instances of the domain 100 ideal for use with a cloud computing platform.

Another advantage is that each of the elements of the domain 100 (the UID 101, the TY element 102, the NT element 103, and the XT element 104) may be individually addressed by an application program, with the kind of data in each element generally known before a query against the datastore is made. In general, a person knowing little about the contents of the datastore may request data that identifies things (e.g., by requesting the TY element 102). For example, an application program may request just the TY element 102 of each of several of the domains 100 such that a user of the application program can identify which of the domains 100 for which he or she is searching or what they contain. Similarly, constrained references within the NT element 103 may be followed without drawing upon information within the TY element 102 or XT element 104. Once a domain 100 of interest is identified, data within the NT element 103 may be used and additional context about the domain 100 can drawn from the XT element 104, such as the domain 100's relationship to other domains. Additionally, different security features may be defined for each of the elements, allowing the TY element 102 to be displayed while additional security features (e.g., the control policy 552) are triggered when requesting data from the NT element 103.

Figure 7:
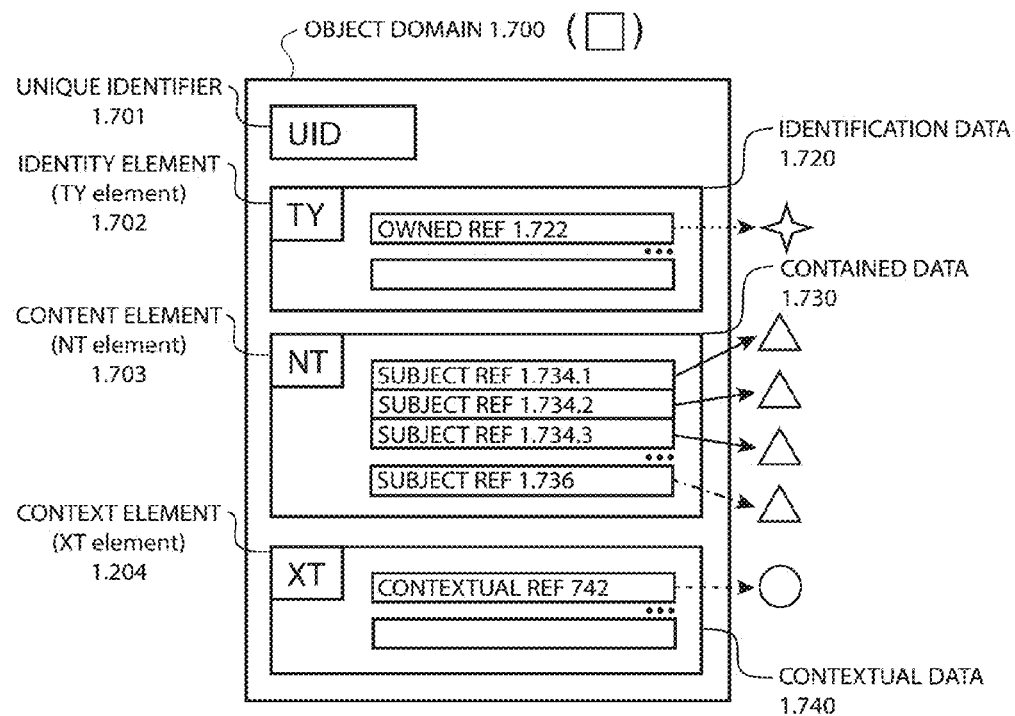
FIG. 7 is an object instantiation of the relation domain of FIG. 3 referred to as an object domain that references one or more of the subject domains of FIG. 2 within the NT element of the object domain, according to one or more embodiments. A square within the present drawings may represent an instance of the object domain.

Yet another advantage of the domain 100 is that references made through the NT element 103 may have architectural constraints imposed (e.g., the directed acyclic graph (DAG) architecture 600 of FIG. 6 and/or the object domain 700 of FIG. 7) whereas references made through the XT element 104 may remain flexible by referencing any other domain within the datastore (e.g., through the contextual ref 142). The architectural constraints may allow for a relatively rigid data structure that may model, for example, containing relationships, while the flexible references may be used to for semantic relationships within the data structure. This structure may segregate relationships by purpose, permitting targeted query that may reduce computing resources.

In one or more of the present embodiments, once the UID 101 of the domain 100 is obtained, all of the data within the domain 100 can be directly accessible by an application program, generally with minimal time and energy expenditure. In one preferred embodiment, almost every piece of data within the datastore is an instantiation of the domain 100, which may allow any data to be easily analyzed and directly addressed, subject to security parameters defined by the security node 500. Application programs may be able to easily combine data from several domains 100 without complex query but by directly addressing several resources from which data is to be drawn.

Specialized instantiations of the domain 100 that further define the data structure within the memory are shown in the embodiments of FIG. 2 through FIG. 11 and described in the accompanying text. Within the present drawings symbols may be used to represent instantiations of the domain 100 as shown in the key of FIG. 1F: a circle for any instantiation of the domain 100; a triangle for the subject domain 200; a circle having three contained circles for the relation domain 300, a four-pointed star for the owner domain 400; and a shield shape for the security domain 500. The shield shape may contain one of the other shapes demonstrating a hybrid whereby one of the instantiations of the domain 100 further comprise features of the security domain 500 such as the control policy 552. In addition, the relation domain 300 may have several instantiations, including: a square for the object domain 700, a pentagon for the stack domain 800, a hexagon for the collection domain 900, and a heptagon for the epi-collection 1000. An instantiation of the domain 100 that is shielded by the security domain 500 is denoted with an asterisks.

Also shown in the key of FIG. 1F are different styles of arrowed lines used to represent different kinds of relationships that may be defined between and/or among the instantiations of the domains 100. The relationships represented by the arrowed lines may be effectuated with referential attributes (e.g., the owned ref 222, the domain ref 134, the contextual ref 342). In general, a solid line shows a reference that may have one or more architectural constrains applied (effectuated with, e.g., the domain ref 134, the owning ref 434) or a reference to a memory address holding a primitive data 105 (effectuated with, e.g., primitive ref 131, primitive ref 231). A dashed line is generally an unconstrained reference (e.g., the unconstrained reference 642 of FIG. 6 effectuated with, e.g., contextual ref 142). Unconstrained references may generally reference any other domain of the datastore within parameters defined by the security domain 500, as described below. A dotted line is generally a reference from a domain 100 to an owner domain 400 that owns the domain 100. Finally, a dashed-dotted line may be a reference to a representation domain (e.g., the representation domain 1101 of FIG. 11, referenced, for example, with the representation ref 136). A reference to a representation domain may also have one or more architectural constraints applied by constraining permissible values of a referential attribute.

Each of the instantiations of the domain 100 are comprised of analogous primary elements which may be numbered in coordination with the domain 100. For example, the subject domain includes a UID 201, a TY element 202 (comprising identification data 220), an NT element 203 (comprising contained data 230), and an XT element 204 (comprising contextual data 240). Similarly, the identification data 220 includes data usable to either label a particular subject domain 200 or distinguish the particular subject domain 200 from any other domain 100 within the datastore. The contained data 230 includes data that the particular subject domain 200 contains. The contextual data 240 comprises data that further characterizes the particular subject domain 200. However, the analogous elements of a particular instantiation of the domain 100 may be comprised of specific structures (e.g., sub-elements, attributes, values, data) and/or specific kinds of references that facilitate certain functionality. For example, one defining feature of the owner domain 400 is that it includes within the NT element 403 an owning ref 422 attribute drawn to each instantiation of the domain 100 that the owner domain 400 owns and/or "possesses." A domain 100 may also be owned by an owner domain 400 when the domain 100 is created by an application program modeled and/or represented by an associated owner domain 400. Similarly, a domain 100 may be owned by an owner domain 400 that represents a person who may be logged into a particular service run by an application program. The inclusion of the owning ref 434 in the TY element 402 may allow an application program to quickly identify each of the domains 100 owned by a user by querying the NT element 403 of the owner domain 400.

Each of the instantiations of the domain 100 will now be described. FIG. 2 illustrates a fundamental instantiation of the domain 100 of FIG. 1A referred to as the subject domain 200 defining a data structure that contains a primitive data 105 that is embedded and/or referenced through the NT element 203, according to one or more embodiments. The subject domain 200 may be used to contain a fundamental piece of data, for example an audio file, a computer aided drafting (CAD) file, a document, a digital image, a file of any other MIME type, a cryptographic key (including a private key used for data encryption and/or a private key of a cryptographic currency (e.g., Bitcoin)) and/or a BLOB usable to store any block of binary information. The subject domain 200 may also be used to store components of a larger file, for example a vector path that is part of a digital illustration comprising many such vector paths or a paragraph of a document. The NT element 203 comprises a contained data 230 that includes one or more attribute-value pairs holding a primitive data 205 that is embedded (the primitive data 205 being a value of the primitive 231 attribute) and/or referenced through a reference to a memory address (the primitive data 205 being a value of the primitive ref 232 attribute). However, in one or more preferred embodiments, each instance of the subject domain 200 contains a single fundamental piece of data. Specifically, in that case the NT element 203 of the subject domain 200 contains only one instance of the primitive data 205, whether embedded or referenced (e.g., a single file stored as a BLOB-type value of a single attribute). That each fundamental piece of data is assigned to its own subject domain 200 may allow for increased flexibility in drawing relationships between data and/or may improve search of the datastore. In one or more embodiments, as shown in FIG. 1A, the identification data 220 for a particular subject domain 200 includes an owned ref 222 to an owner domain 400 that owns the particular subject domain 200.

FIG. 3 illustrates a relational instantiation of the domain of FIG. 1A referred to as a relation domain 300, the relation domain 300 defining relationships between one or more other domains 100 and that may include constrained relationships through an NT element 303 and unconstrained contextual relationships through the XT element 304, according to one or more embodiments. The relation domain 300, which may have its own elements for identity, content and context, treats a relationship between domains 100 as a real-world "thing" or object to be explicitly stored as a data structure deposited in the memory. This may be different than, for example, a programmatic relationship defined in an application program to relate rows and columns of tables in a relational database. Programmatic relationships may require computing resources (e.g., a "join" operation in a relational database) to process software code of the application program necessary to derive the relationship, decreasing efficiency of a data processing system.

The contained data 330 of the NT element 303 may contain one or more references to other domains 100 through instances of the domain ref 334 (e.g., the domain ref 334.1, 334.2, etc.). For example, the contained data 330 may include attribute-value pairs for referencing several instances of the subject domains 200 (e.g., a subject domain 200A, a subject domain 200B) and/or several other relation domains 300. In addition, the contained data 330 may include one or more representation refs 336 that reference domains 100 that are usable by an application program to represent the relation domain 300. The representation domain, which is further described in conjunction with FIG. 11, may facilitate a selection of the data within the relation domain 300 by a user of an application program. As shown and described in conjunction with FIG. 6, particular architectural constrains may be imposed on the references in the NT element 303 to define additional structure within the memory that may be useful for modeling particular kinds of real-world relationships. Similar to the subject domain 200, the identification data 320 for a particular relation domain 300 may include an owned ref 322 to an owner domain 400 that owns the particular relation domain 300.

FIG. 4 illustrates an owner instantiation of the domain 100 of FIG. 1A referred to as an owner domain 400, the owner domain 400 representing an owner that is a person or an owner that is a machine and referencing each domain 100 owned by the owner domain 400 through the NT element 404, according to one or more embodiments. The owner that is a person may be a user of the datastore and/or a user of one or more application programs that utilize the datastore, for example a person using a social network, a consumer using a game on a smartphone, a researcher contributing to a scientific datastore, or an employee using proprietary application programs of an enterprise. The owner that is a machine may be an application program, specific components and/or processes of an application program, an operating system, and/or pieces of physical computing hardware such as a network router. Where the owner is a person, the TY element 402 may include a variety of data that can be used to identify the person, including: a legal name, a social security number, an email address, a physical address, a username, and a password. Where the device is a machine-user, the data used to identify the machine and/or application program may include, for example: a serial number, a network address, and/or a device ID. The NT element 403 may include a reference to each domain 100 owned by the owner domain 400 through one or more owning refs 434 (e.g., 434.1, 434.2, etc.). In one preferred embodiment, each domain 100 is owned by one and only one instance of the owner domain 400. Although not shown in FIG. 4, the owner domain 400 could itself be owned by another owner domain 400 (e.g., an owner domain 400A having a UID 401B as a value of an owning ref 434A), although it may be beneficial for some datastores to maintain each owner domain 400 as a "root" which is not owned by any other owner domain 400. Additionally, where a person that is using multiple application programs, it is preferred that the person be represented by a single owner domain 400 within the datastore. This may allow all of the user's domains 100 to be easily retrieved simply requesting the contained data 430 of the NT element 403. Although not shown in FIG. 4, one or more sub-elements may be included within the XT element 404 to append application-specific data to the owner domain 400. For example, an application sub-element associated (e.g., the application sub-element 146) with a particular application program may reference each domain 100 that has been used as a data resource by the particular application program, or may include login credentials for the application program.

Figure 8:
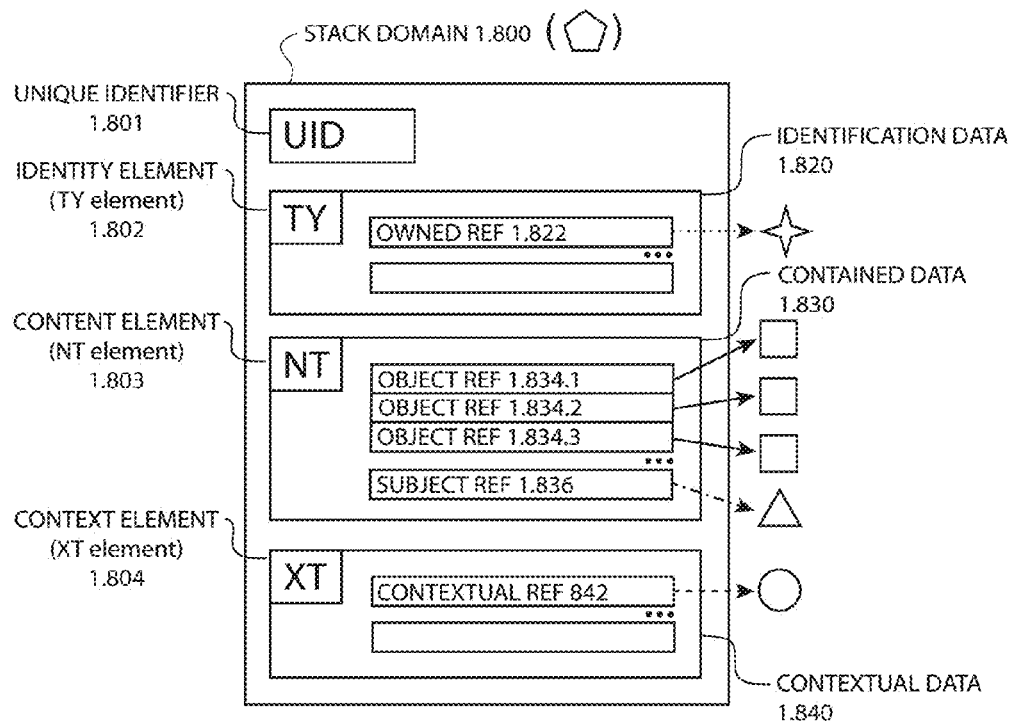
FIG. 8 is a stack instantiation of the relation domain of FIG. 3 referred to as a stack domain that references one or more of the object domains of FIG. 7 within the NT element of the stack domain, according to one or more embodiments. A pentagon within the present drawings may represent an instance of the stack domain.

FIG. 5 illustrates a security instantiation of the domain of FIG. 1A referred to as a security domain, the security domain including a control policy usable to secure access to and/or use of data within the security domain itself and/or within a different domain referenced by the security domain, according to one or more embodiments. The different domain 100 may be referred to as a shielded domain and in the present drawings is represented by an asterisks associated with the symbol corresponding to a particular instantiation of the domain 100 (e.g., an asterisks placed in association with the pentagon symbol that represents the stack domain 800 of FIG. 8 represents that the stack domain 800 is a shielded domain).

The security domain 500 contains some protected resource that is data (e.g., one or more attribute-value pairs of one of the elements, especially the primitive 131 and/or referential attributes) along with a control policy 552. The control policy 552 may be stored in a security sub-element 551 of the NT element 503 and/or the XT element 504 similar to the application sub-element 146. The control policy 552 contains some data related to permissible access and/or use of the protected resource. For example, the control policy 552 may contain a control algorithm and/or a control dataset that evaluate a context of an authorization request for the protected resource (e.g., the authorization request made by a use, a device). Additional data structures, systems and methods for use of the security domain 500, along with the control policy 552, may be disclosed in co-pending patent applications of similar inventive entities and/or similar assignees.

The protected resource may be, for example, one or more referential attributes. For example, in one or more embodiments, the contained data 130 of a relational domain 300 domain (or a portion of it) is replaced with a security ref 322 that references the security domain 500, for example through referencing the UID 501 of the security domain 500. The original contained data 130 of the relation domain 300 is then placed in the NT element 503 of the security domain 500. For example, in FIG. 5, the domain ref 334 was removed from the relation domain 300 and placed in the security domain 500 to become the domain ref 534.

A control policy 552 may be seen as attached to the domain 100 that includes the protected resource that the control policy 552 controls. This may be in contrast to a relatively static, centralized location such as a lookup table associated with an operating system and/or a database (which may be referred to as an "access control list"). In one or more embodiments, the security domain 500 and the associated control policy 552 may provide an alternative to hierarchical access controls that might otherwise allow complete access to a leg of the hierarchy once access to a parent node of the hierarchy is granted by the access control list. The control policy 552 may function independently of a database and/or operating system managing authorization requests.

In addition, control policy 552 may be more useful and flexible than traditional access control lists. The control policy 552 may be an arbitrarily complex (e.g., written in a Turing complete language), application-specific policy for the use of data within the security domain, and, in conjunction with the security program, may be usable to institute "capability based controls." Specifically, the control policy may be used to regulate use of the data within the security domain 500 based upon a number of criteria, including a location of a device (e.g., a set of geospatial coordinates, a geo-fenced location). The device, e.g., the device 2500 of FIG. 25, may be a computer, a tablet, a smartphone, and/or a piece of hardware having network accessibility such as a 3D printer. The criteria of the control policy 552 may also include a type of device (e.g., an iPhone 6 Plus®, an Android® phone, a Galaxy S III®, an iPad®), a type of operating system (e.g., Windows®, iOS®, Mac OSX®, Android®), an application program (e.g., a specific application program which may be represented by an owner domain 400 such as a game, a database or a spreadsheet), a query time (such as 14:09:34 EST), a query date, a number of uses of data, and a type of use of data. The type of use of data may include monitoring other data provided by an application program, for example, how the application intends to use the data in a shielded domain (e.g., the make, model, and color settings of an inkjet printer; a configuration and/or settings of a 3D printer). The criteria of the control policy may also include a number of accesses of data (such as from a specific user and/or owner domain 400), a duration of use of the data within the shielded domain by one or more computer applications, a particular owner domain 400, and an activity of a software application for which the shielded domain is a data resource. Several of the criteria of the control policy may be simultaneously analyzed using a complex decision tree (e.g., established through a control algorithm). Various methods for mediating requests of application programs to effectuate regulation of access to and/or use of data within the shielded domain may be known in the art. Additional methods may be disclosed in co-pending patent applications by related inventive entities and/or an assignee of rights associated with the present embodiments.

In one or more embodiments, the protected resource may be the primitive data 105. However, FIG. 5 provides a specific example of the use of the security domain 500 to shield access to one or more domains 100 referenced by a relation domain 300 without disrupting the role that the relation domain 300 may have in modeling relationships. An original contents of the contained data 330 may be the domain ref 334 and the representation ref 336. Once the security domain 500 is created, the contained data 330 receives the security ref 338 attribute, the value of which is the UID 501 of the security domain 500. One or more attribute-value pairs from the contained data 330 are then removed from the contained data 330 and placed in the contained data 530. For example, domain ref 334 from the contained data 330 is placed in the contained data 530 to become the domain ref 534 (the value of which may be unchanged). One or more attribute-value pairs of the contained data 330 may remain unsecured by the control policy 552 effected by the security domain 500. In FIG. 5, for example, the representation ref 336 and its associated value are not protected by the security domain 500. When mediating a request for the NT element 303 of the relation domain 300 from an application program, the request may have returned the values of the security ref 338 and the representation ref 336. Data within the representation ref 336 may be immediately available to requesting application programs. The contents of the security domain 500 may be further mediated by a security program comparing contextual values of data associated with the authorization request with parameters of the control policy 552. In one or more embodiments, the security domain 500 may act as a domain of indirection, and may therefore allow access to, or use of, data within domains 100 originally referenced by the relation domain 300 without providing the UID 101 of those domains 100 to a requesting user and/or application program. Preventing some users and/or application programs from even addressing a domain by hiding the UID 101 of the domain originally directly referenced by the relation domain 300 may drastically improve security of data and/or information within the datastore.

In addition to having several specialized instantiations of the domains 100, the domains 100 within the datastore may be organized such that they reference one another according to a particular arrangement that further adds organization to the data structure resident in the memory. This additional organization may be used to model particular types of relationships between real-word things or objects. The additional organization may be imposed, for example, by limiting the permissible values of one or more referential attributes within one or more elements of the domain 100. For example, in one preferred embodiment the additional organization is imposed on each instance of the domain ref 334 of the relation domain 300. The additional organization may be referred to as a "referential constraint."

FIG. 6 illustrates a directed acyclic graph (DAG) architecture 600 that imposes constraints on values of referential attributes within the NT element 103 of the domain 100, while simultaneously permitting unconstrained values of one or more referential attributes within the XT element 104 to allow for flexibility, according to one or more embodiments. A DAG may be a collection of vertices linked by directed edges in such a way that there exists no directed cycles and/or loops within the data structure. A DAG may be useful in modeling particular types of real-world relationships, for example containers and/or versioning of a set of data through time. A DAG can also be useful in finding and retrieving data, for example by allowing application of mathematics that calculates an efficient path from one vertex of the DAG to another vertex.

In FIG. 6, references are shown between and among instantiations of the domain 100 including: a number of relation domains 300 (labeled 300A through 300G); a number of subject domains 200 (labeled 200A through 200E); and an owner domain 400X. Although not numbered in FIG. 6, each element of each instantiation of the domain 100 will be referred to using a corresponding number of the element from previous described embodiments. For example, the relation domain 300A includes the UID 301A and the subject domain 200C includes the XT element 204C. Each of the NT elements 203, 303 and 403 (of the subject domains 200, the relation domains 300, and the owner domain 400, respectively) may form a set of vertices 603 of the directed acyclic graph. For example, NT element 303D may form vertex 603D. Referential attributes within each NT element 303 and XT element 403 (e.g., the domain ref 334 attribute and the owning ref 434 attribute) may be referred to as directed edges 635 of the DAG, represented by solid arrowed lines, e.g., the relation domain 300A includes three directed edges 635.1A, 635.2A, and 635.3A. For clarity, some of the directed edges 635 and vertices 603 are not labeled.

FIG. 6 shows various features of the DAG architecture 600. First, the DAG of FIG. 6 has two "entry points" that receive no directed edge 603—the relation domain 300A and the owner domain 400. Second, the DAG of FIG. 6 has six end-points: the relation domain 300D and the subject domains 200A through 200E. Third, a single vertex 603 may initiate multiple directed edges 635, as shown where relation domain 300A references relation domains 300B, 300D and 300F via directed edges 635.1A, 635.2A, and 635.3A, respectively. Fourth, multiple directed edges 635 may point to a single vertex 603, as shown where relation domain 300D is referenced through NT element 303A of relation domain 300A and is also referenced through NT element 303B of relation domain 300B. Finally, no directed cycles are formed through references within the NT elements 203, 303, and 403 (e.g., directed edges 635 represented by the solid arrowed lines). Although not shown, the owner domain 400X can own each of the instantiations of the domains 100 in FIG. 6 without violating the DAG architecture 600.

Also illustrated in FIG. 6 are two owned reference 132 attributes of the domain 100 and several instances of the unconstrained references 642. Specifically, relation domain 300B is owned by the owner domain 400X and therefore may reference domain 400X through owned ref 322B of the TY element 103B (not labeled). Similarly, subject domain 200A is owned by the owner domain 400X and therefore may reference domain 400X through owned ref 122A of the TY element 203A (also not labeled). The XT element 104 of each of the instantiations of the domain 100 in FIG. 6 may each include one or more instances of the unconstrained reference 642, shown in dashed lines. The unconstrained reference 642 may, for example, be effected by the contextual ref 142. In contrast to the directed edges 635, for example, the unconstrained references 642 may form a directed cycle, as shown by the dashed arrows that run from relation domain 300D to 300B, from 300B to 300C, and from 300C back to 300D. A domain 100 may have multiple unconstrained references 642, for example the unconstrained reference 642.1D and 642.2D. "Unconstrained" references may, however, be subject to security protocols of the datastore. For example, according to one or more embodiments, any shielded domain may have unconstrained references drawn to the security domain 500 referencing the shielded domain rather than directly to the shielded domain.

Arranging different kinds of references within different elements may improve efficiency of a computer, especially in a cloud computing environment where scalability and performance may be important. Separation of concerns between identifying a data resource (e.g., via TY element 102), following a set of relatively structured relationships (e.g., via NT element 103), and following a set of relatively flexable relationships (e.g., via XT element 104) may allow each element of the domain 100 to be discretely queried or updated by an application program depending on which of these concerns is implicated at a given time. The processor of a server computer managing requests from the application program and storage hardware (e.g., a hard disk) may therefore only need to read or write within a particular element of the domain 100. For example, a database managing the datastore may be able to follow references within the NT element 103 of each of a set of the domains 100, and, upon arriving at a particular domain 100 that is identified to be correct, request the XT element 104 of the particular domain 100. The database may then examine the particular domain 100's semantic relationships and/or establish a context for the use of the particular domain 100.

In addition to the DAG architecture 600, referential constrains of even greater specificity may be applied to references within the domain 100. As a general illustration, domains 100 containing a first kind of data may be prevented from (or required to) reference domains with a second kind of data. FIG. 7 through FIG. 10 show instantiations of the relation domain 300 that can be used to model relationships that are, for example, containers of several layers or "orders" of structure, as shown in FIG. 11 through FIG. 14. For example, the set of subject domains 200 within the datastore may form a first order of structure. FIG. 7 is an object instantiation of the relation domain of FIG. 3 referred to as an object domain 700 that references one or more of the subject domains 200 of FIG. 2 within the NT element 703 of the object domain 700, according to one or more embodiments. The set of object domains 700 within a datastore may therefor be a second order of structure. The contained data 730 comprises a reference to each of one or more subject domains 200. The object domain 700 may also reference a representation domain. In one preferred embodiment, the object domain 700 is a relation between two instances of the subject domains 200: a first instance that is a derivative domain (e.g., the derivative domain 1100) and a second instance that is a representation domain (e.g., the representation domain 1101). The derivative domain includes contained data 230 to be primarily acted upon by a computer application (e.g., a primitive 205 that is a audio file, a document). The representation domain, on the other hand, is usable by the computer application to represent the first instance (e.g., a primitive 205 that is an image of music track art or an abstract of the document). The relation between the derivative domain and the representation domain may facilitate a selection of the data to be primarily acted upon by the computer application, as shown and described in conjunction with FIG. 11. The reference to the derivative domain and the representation domain, as shown in FIG. 7, may be respectively effected through the subject ref 734 and the subject ref 736.

FIG. 8 shows a similar arrangement, wherein a stack instantiation of the relation domain 300 of FIG. 3 referred to as a stack domain 800 references one or more of the object domains 700 of FIG. 7 within the NT element 803 of the stack domain 800, according to one or more embodiments.

Figure 9:
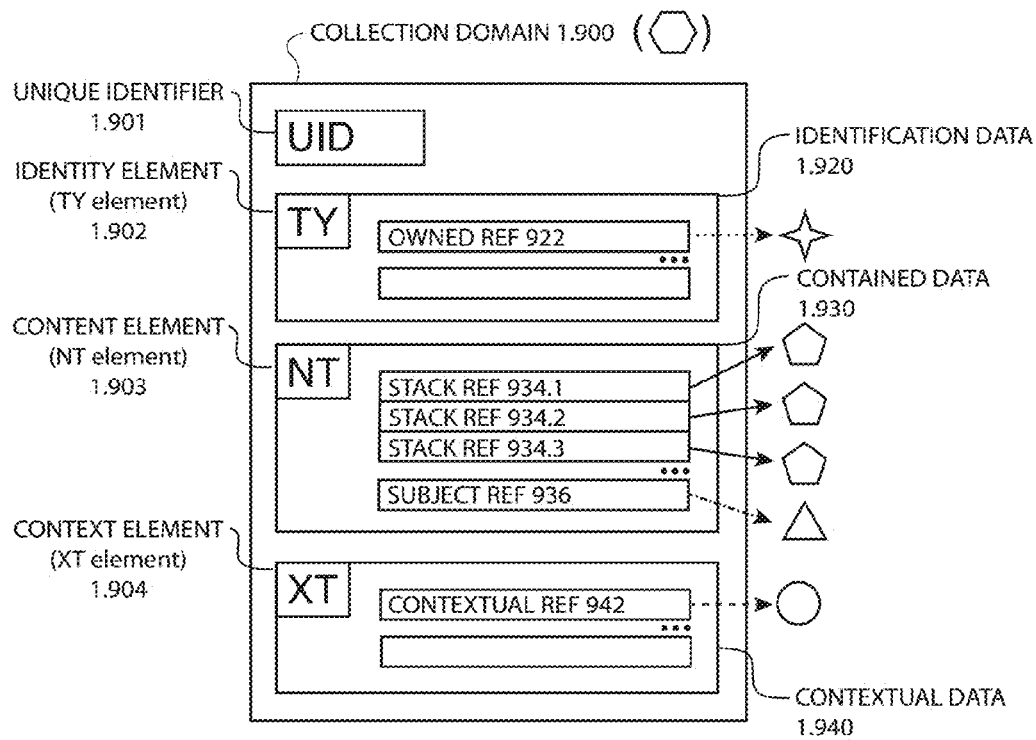
FIG. 9 is a collection instantiation of the relation domain of FIG. 3 referred to as a collection domain that references one or more of the stack domains of FIG. 8 within the NT element of the collection domain, according to one or more embodiments. A hexagon within the present drawings may represent an instance of the collection domain.
Figure 10:
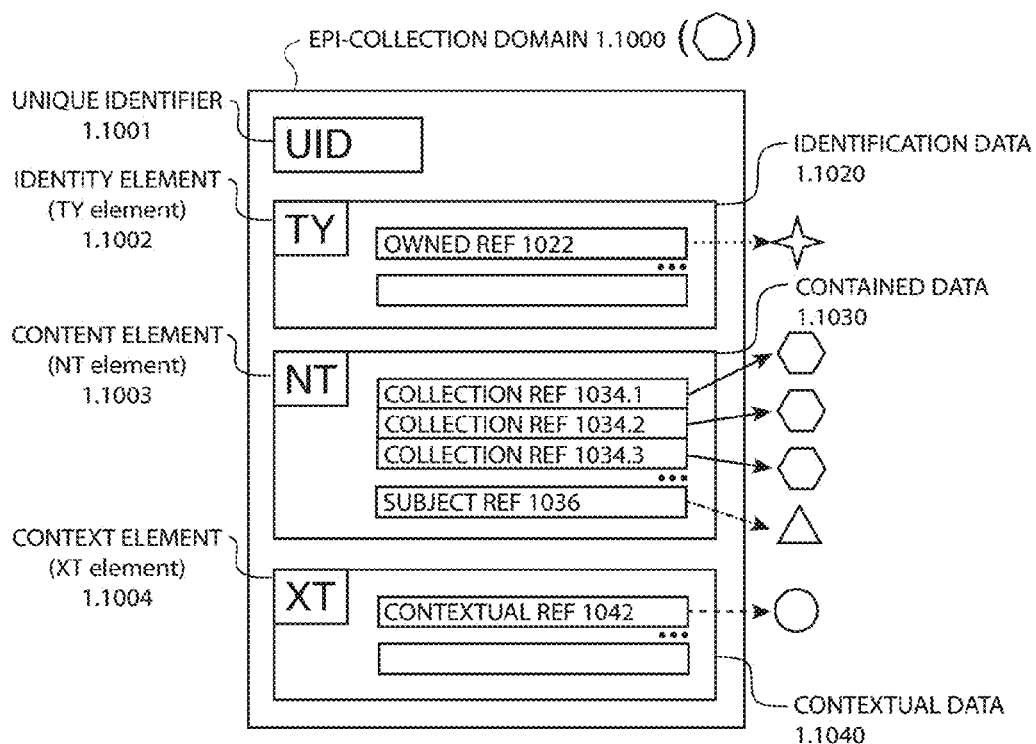
FIG. 10 is an epi-collection instantiation of the relation domain of FIG. 3 referred to as an epi-collection domain that references one or more of the collection domains of FIG. 9 within the NT element of the epi-collection domain, according to one or more embodiments. A heptagon within the present drawings may represent an instance of the epi-collection domain.

The stack domain 800 comprises references to each of two or more object domains 700. The stack domain 800 may therefore act as a third order of structure within the datastore. That stack domain 800 may also comprise a reference to an instance of the subject domain 200 usable by one or more computer applications to represent the contained data 830 of the stack domain 700 (e.g., a representation domain 1101). In a preferred embodiment, the stack domain 800 only references one or more object domains 700 along with, optionally, a single subject domain 200 that acts as a representation domain of the object domain 700. FIG. 9 and FIG. 10 are similar. FIG. 9 is a collection instantiation of the relation domain 300 of FIG. 3 referred to as a collection domain 900 that references one or more of the stack domains 800 of FIG. 8 within the NT element 903 of the collection domain 900, according to one or more embodiments. The collection domain 900 may therefore act as a fourth order of structure within the datastore. In a preferred embodiment, the collection domain 900 only references one or more stack domains 800 along with, optionally, a single subject domain 200 that acts as a representation domain of the collection domain 900. FIG. 10 is an epi-collection instantiation of the relation domain 300 of FIG. 3 referred to as an epi-collection domain 1000 that references one or more of the collection domains 900 of FIG. 9 within the NT element 1003 of the epi-collection domain 1000, according to one or more embodiments. The set of epi-collection domains 1000 within the datastore may be referred to as a fifth order of structure within the datastore. Again, in a preferred embodiment, the epi-collection domain 1000 only references one or more collection domains 900 along with, optionally, a single subject domain 200 that acts as a representation domain of the epi-collection domain 1000. Additional higher-order instantiations of the relation domain 300 may be defined according to this pattern, although it may be preferable that all real-world objects or things, especially for content delivery networks, may be modeled without additional higher-order instantiations of the domains 100 to reduce query times associated with walking referential chains and/or networks. However, due to the UID 101 of each domain 100, once a referential chain and/or network is traveled to identify a particular domain 100, the particular domain 100 may be directly addressed without walking the chain and/or network (reducing associated computing costs).

Figure 11:
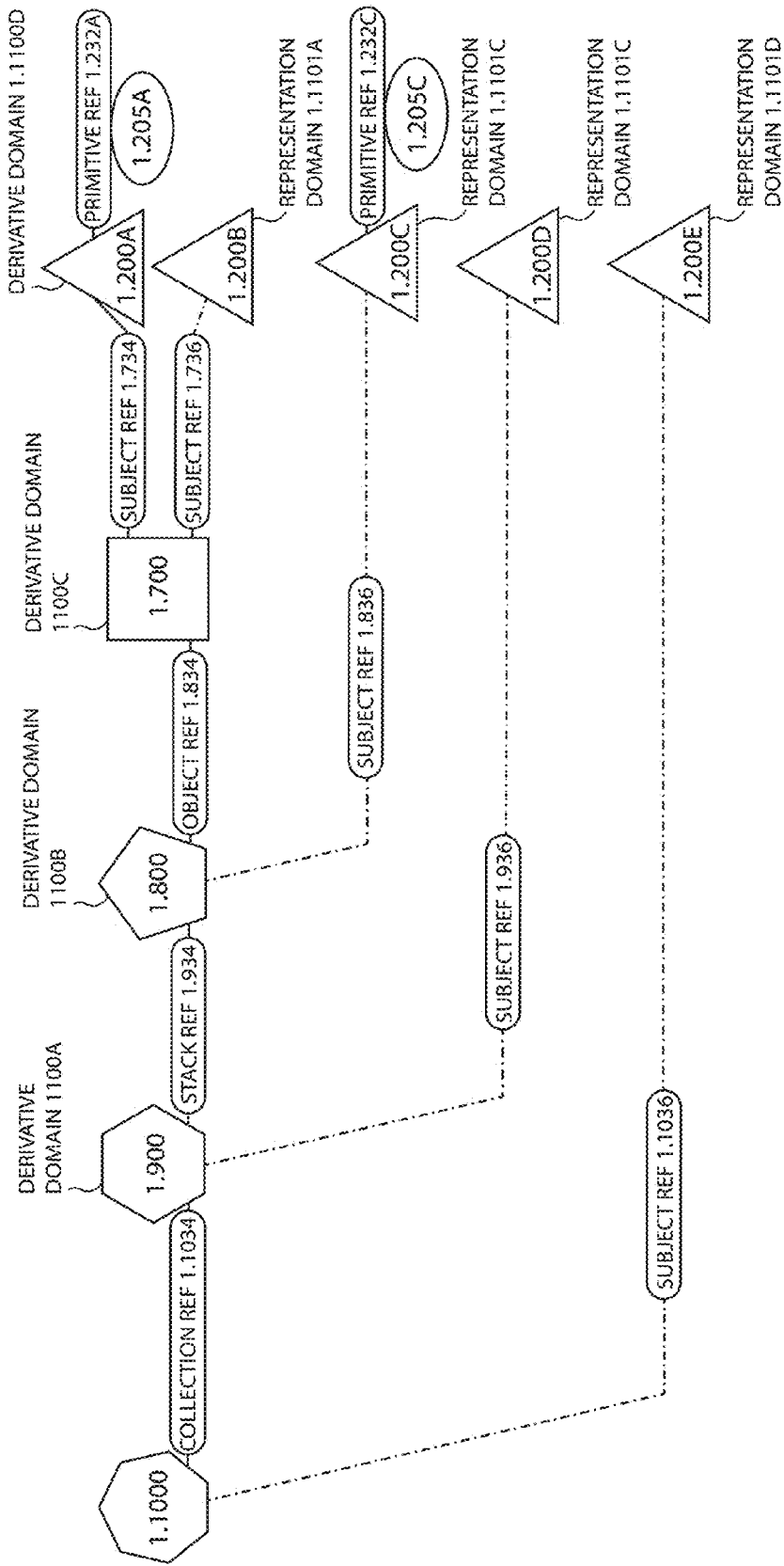
FIG. 11 is a derivative-representation structure illustrating instantiations of the relation domain that each reference a derivative domain having data to be primarily acting on by an application program and also each referencing a representation domain usable by the application program to facilitate a selection of data within the derivative domains, according to one or more embodiments.

FIG. 11 is a derivative-representation structure illustrating instantiations of the relation domain 300 that each reference a derivative domain 1100 having data to be primarily acting on by an application program and also each referencing a representation domain 1101 usable by the application program to facilitate a selection of data within the derivative domains 1100, according to one or more embodiments. An instantiation of the domain 100 may include within the contained data 1030 one or more derivative domains 1100 and one or more representation domains 1101. In FIG. 11, an application program may request data of the epi-collection 1000, and a database may return both the values of the references to the derivative domains 1100 and the representation domains 1101 stored within the contained data of each. In FIG. 11, the derivative domain 1100A of the epi-collection domain 1000 is the collection domain 900 (referenced through collection ref 1034), and the representation domain 1101D of the epi-collection domain 1000 is the subject domain 200E (referenced through subject ref 1036). Similarly, in the embodiment of FIG. 11, the derivative domain 1100B of the collection domain 900 is the stack domain 800, and the representation domain 1101C of the collection domain 900 is the subject domain 200D. While each of the subject domains 200 of FIG. 11 have a primitive 205 within their contained data 220, some are shown referenced (e.g., the subject domain 200A and 200C) while some are not shown being that each has an embedded primitive 205 (e.g., within the subject domains 200B, 200D and 200E).

The inclusion of the representation domain 1101 may improve efficiency of a database returning data resources to an application program. The application program, for example, may request the representation domain 1101 from a particular domain 100 to be retrieved before the derivative domains 1100. This may allow a user of the application program, or the application program itself, to determine whether the domain 100 contains the correct data before requesting data in the derivative domain 1100. For example, an application program may be instructed to populate a menu on a user interface by retrieving several instances of the domain 100. Where each of the domains 100 contain a reference to a representation domain 1101, the menu may then be populated with a primitive 105 of the representation domain 1101 (e.g., images). The representation domains 1101 may contain "light weight" data that is smaller than that in the derivative domain 1100 (for example, a small PNG image rather than a large AAC audio file). The use of representation domains 1100 may therefore reduce back-end processes rather than requiring the retrieval of an entire file before its contents (and/or metadata) can be identified and selected. Similarly, security features (such as the control policy 552) may be defined for individual elements of a domain 100, allowing different security measures for identification of the contents of the domain 100 without authorizing utilization of the contents of the domain 100. Although not shown in FIG. 11, a single subject domain 200 may be used as a derivative domain 1100 for one domain 100, while acting as a representation domain 1101 for another domain 100. A specific example of the use of the derivative domain 1100 and the representation domain 1101 is shown and described in conjunction with FIG. 23, FIG. 25, and FIG. 26. The representation domain may be especially useful in populating UIs of mobile devices (e.g., smartphones) where data transfer rates are slow and/or bandwidth is expensive.

FIG. 11 also illustrates orders of structure within the datastore formed by the one or more domains 1.100. The subject domains 1.200 (e.g., the subject domains 1.200A through 1.200E) form a first order of structure. The object domains 1.700 forms a second order of structure, the stack domain 1.800 forms a third order of structure, the collection domain 1.900 forms a fourth order of structure, and the epi-collection domain 1.1000 forms a fifth level of structure.

Figure 12:
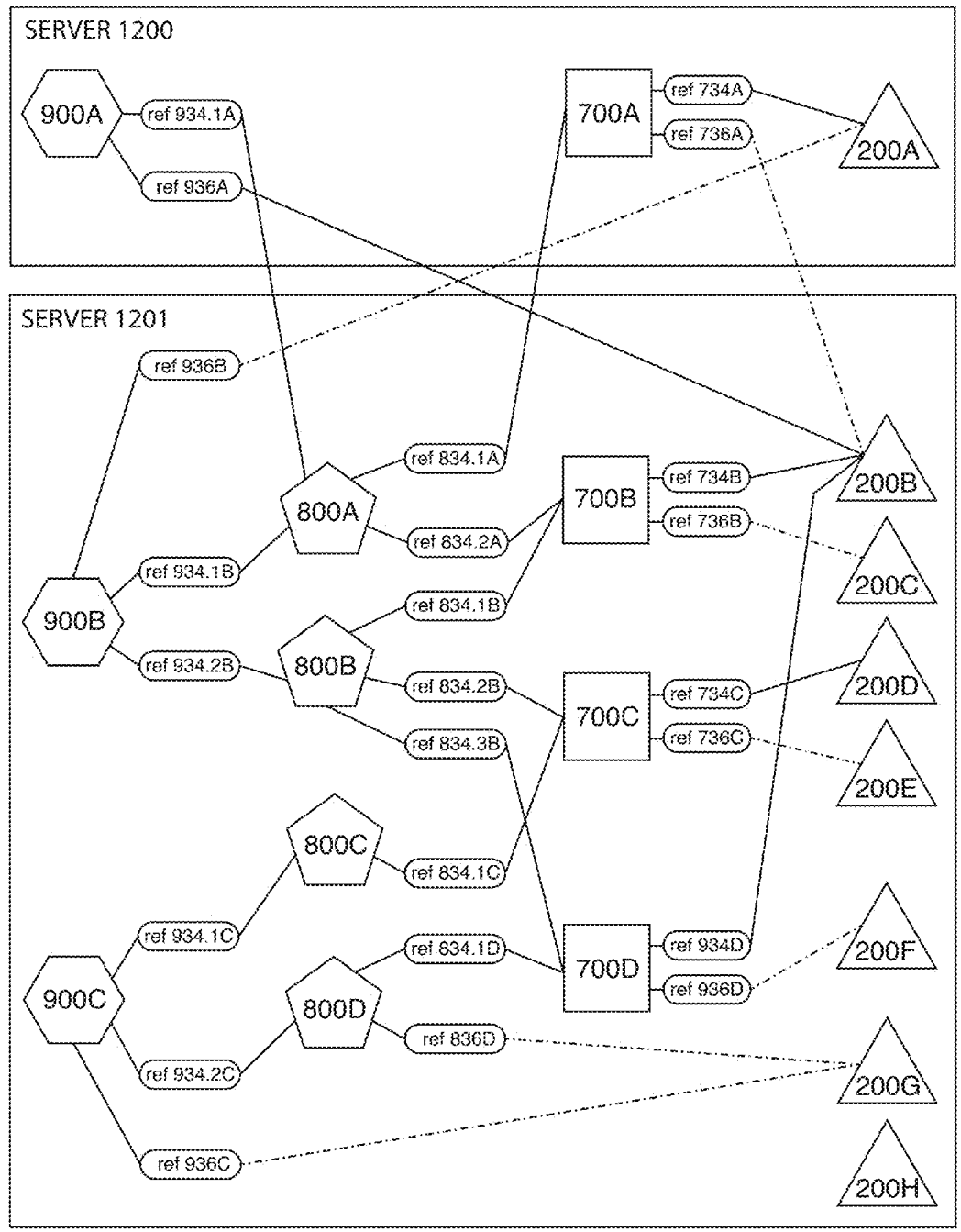
FIG. 12 is a server view illustrating a datastore spread across multiple servers and shows an example of some of the permissible references between subject domains 200, object domains 700, stack domains 800 and collection domains 900, according to one or more embodiments.

FIG. 12 is a server view illustrating a datastore spread across multiple servers and shows an example of some of the permissible references between subject domains 200, object domains 700, stack domains 800 and collection domains 900, according to one or more embodiments. For clarity, reference labels have been attenuated (e.g., stack ref 934.1B is referred to as "ref 934.1B"), arrows have been excluded (although in FIG. 12 run from domains 100 of higher orders of structure on the left (e.g., the collection domains 900) to domains 100 of lower orders of structure (e.g., the subject domains 200) on the right). For clarity, possible unconstrained references have been excluded in the embodiment of FIG. 12. As shown in FIG. 12, the datastore may exist on multiple servers (e.g, server 1200 and server), some of which may be proximate (e.g., within the same datacenter) while others may be spread across a wide geographic area and/or located in data centers across the globe. The solid lines in FIG. 12 represent references for which the referential constraints of the object domain 700, the stack domain 800, and the collection domain 900 have been applied. FIG. 12 also demonstrates: that some domains 100 within the datastore may not be referenced (e.g., subject domain 200H); that a single domain 100 may be used as a derivative domain 1100 for one domain 100 while acting as a representation domain 1101 for another domain (e.g., subject domain 200A is a derivative domain 1100 for object domain 700A, while a representation domain 1101 for collection 900A); and that a domain 100 may be a derivative domain 1100 for multiple other domains 100 (e.g., object domain 700C is a derivative domain 1101 for both stack domain 800B and stack domain 800C).

Figure 13:
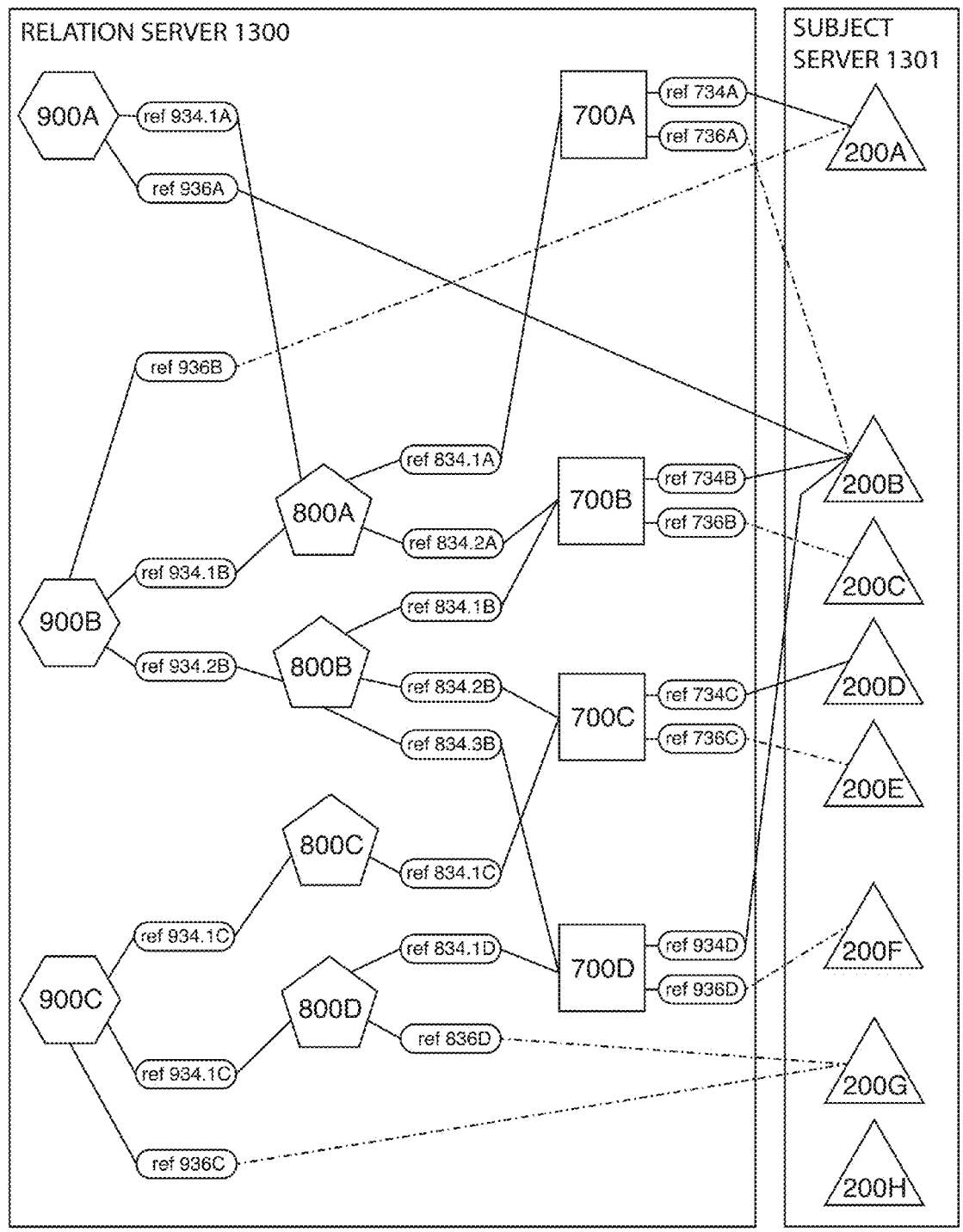
FIG. 13 is a server view illustrating a datastore spread across multiple servers, the instantiations of the relation domains of FIG. 7 through FIG. 9 held in a first memory of a relation server and the subject domains of FIG. 2 held in a second memory on a subject server, according to one or more embodiments.

FIG. 13 is a server view illustrating a datastore spread across multiple servers, the instantiations of the relation domains 300 of FIG. 7 through FIG. 9 held in a first memory of a relation server 1300 and the subject domains of FIG. 2 held in a second memory on a subject server 1301, according to one or more embodiments. FIG. 13 shows one preferred configuration of a database administering the datastore. Subject domains 200 may be segregated onto a subject server 1301 that can be configured for read-heavy operations being that one or more of the subject domains 100 may include primitive data 205 that may be relatively large (e.g., a video file for streaming). In contrast, the relation server 1300 may hold instantiations of the relation domain 300 that may have fewer read operation to conduct but may receive requests for write operations relatively frequently. In other words, the domains 100 may be placed on top of other data structures (and/or commercial databases) that are especially suited for a particular type of workload. For example, the subject domains 200 subject server 1301 may be placed on top of an ordered key-value store (e.g., the key value-store of FIG. 1C) whereas the relation server 1300 may simply be placed in linear memory (e.g., the linear memory of FIG. 1B). This separation of concerns between the data model and storage technology may create a data structure in the memory that has a defined but flexible schema while simultaneously embracing advantages of multiple storage layers (e.g., BASE and/or ACID transactions). The consistency in syntax and semantics of the domain 100 may also reduce translation cost when moving data between storage layers (e.g., decreasing impedance mismatch) and reduce organizational complexity such that the datastore may be transitioned onto or off of particular storage layers.

FIG. 14 is a domain map that shows instantiations of the domains 100 of FIG. 1A graphically organized for presentation on a user interface, according to one or more embodiments. For clarity, FIG. 14 does not show contextual references 142, owned references 122, or owning references 434. Also for clarity, both domain references 134 and representation references 136 are shown as solid lines rather than conforming to the key 199 of FIG. 1F. The domain map 1400 may allow for an intuitive user interface that may provide additional insight for a user when compared to a user interface representing data in a file system (e.g., Windows®, Mac OSX®). Depicted at the center, the owner domain 400 is sown that owns all of the instantiations of the domain 100 in the domain map 1400. Although not shown, the owner domain 400 includes an owing reference 434 to each of the domains 100 of FIG. 14, and each of the domains 100 have an owned reference 122 back to the owner domain 400. In the embodiment of FIG. 14, dashed lines represent logical levels of organization (e.g., the orders of structure within the datastore) rather than references. The innermost ring may be the first order of structure comprised of the subject domains 200 (whether the subject domains 200 are acting as derivative domains 1100 or representation domains 1101). The second ring from the center may be the second order of structure comprised of object domains 700, followed in the next ring by stack domains 800. The outer-most ring may be the fourth order of structure comprised of collection domains 900. A security domain 500 may be placed in association with any of the instantiations of domains 100 on the same ring. The domain map 1400 may easily allow users to define, modify, and delete data within a datastore, and especially aid in understanding semantic relationships between and among pieces of data. Another method that may be used to visualize the datastore is a "hive plot."

Data structures defined by the domain 100 of FIG. 1 and the instantiations of the domain 100 may be created in the memory by an application program such as a database and/or database management system. FIG. 15 through FIG. 18 illustrate a set of general processes that may be used to construct the domain 100 and instantiations of the domain 100. FIG. 19 lays out a specific process that may be used to create the subject domain 200, and FIG. 20A and FIG. 20B illustrates a specific process usable to build the relation domain 300.

FIG. 15 is a domain creation process flow 1550 that illustrates a process by which the application program can construct the data structure defined by the domain 100. The particular data structure built by the end of the process flow 1550 may be referred to as a forming domain 100 for clarity. Process flow 1550 may generally be used to create any instantiation of the domain 100, although additional subroutines may be required (e.g., defining the control policy 552 for the security domain 500).

Operation 1500 receives a selection of a derivative data to be contained by the domain 100. The derivative data may be one or more instances of either the primitive 105 and/or references to other domains 100. For example, a user of the application program may select a file, an image, and/or an audio file to be placed in the forming domain 100. Similarly, a machine-user such as an application program may select a log file to be contained. In addition to or in the alternative, the user may select one or more domains 100 to be contained by the forming domain 100. These selected domains, for example, may be the derivative domains 1100 of FIG. 11 (e.g., either relation domains 300 or subject domains 200 from which the forming domain 100 may be said to "derive"). When referencing other domains 100, the selection that is received can be the UIDs 101 of the other domains 100 to be used as values of the domain ref 134 attribute. The user can also, according to one or more embodiments, select a combination of several instances of the primitive data 105 and/or other domain 100 to be referenced by the forming domain 100.

Operation 1502 optionally receives a selection of a representation data that represents the data to be contained. The representation data, for example, may be a reference to one or more domains 100 that include data representing the forming domain 100 (e.g., the subject domain 200 acting as the representation domain 1101 of FIG. 11). Specifically, the representation data may be the UID 101 of the representation domain (e.g., the representation domain 1101) to be used a value of the representation 136 attribute, enabling an application program to the representation data to a user in the form of a menu and/or a user interface to aid the user in making a selection. Alternatively, the representation data may be an instance of the primitive 105 that is embedded in or referenced by the forming domain 100.

Operation 1504 encapsulates the derivative data and the representation data within an NT element 103 of the forming domain 100. Specifically, each of the attributes and values comprising the derivative data and/or representation data are grouped to form the contained data 120 and placed in the NT element 103. For example, where the data structure is placed in a linear memory, operation 1504 may encapsulate the contained data 120 (e.g., bundle the derivative data and representation data) by associating each piece of data with itself and with the NT identifier 162, as shown in FIG. 1B. Similarly, where the data structure is placed in the memory on the ordered key-value store shown in FIG. 1C, the derivative data and representation data may be both placed on consecutive (e.g., ordered) keys 172. In another example, operation 1504 may encapsulate the derivative data and/or representation data by defining each attribute and value of the derivative data and/or representation data to be stored in a single group within the document format of FIG. 1C (which may be referred to in JSON notation as an "object"). In the entity-attribute-value format, the attributes and values of the contained data 120 may be grouped and associated with an entity (e.g., a single instance of the entity 182) to form the NT element 103, as shown in FIG. 1E. The nature of the contained data 130 may, according to one or more embodiments, determine the type of instantiation of the domain 100. Where the derivative data comprises references to one or more other domains 100, the forming domain 100 may be a relation domain 300 and/or an owner domain 400. Where the derivative data comprises a primitive data 105, the forming domain 100 may be a subject domain 200.

Operation 1506 constructs a TY element 102 of the forming domain 100 by grouping identification data 140. One or more pieces of identifying data (e.g., an owner domain associated with the creation of the forming domain 100, a creation data, a label, a unique property) may be received. In addition, the hastory 124 may be defined in operation 1506, for example by forming one or more transaction records placed in a genesis block of the hastory. The genesis block may be hashed by the hash algorithm to generate a root hash and initiate the controlled identity of the domain within the datastore. Operation 1506 groups the identification data 120 to define the TY element 102. The identification data 120 of the forming domain 100 may be grouped and designated as the TY element 102 similarly to the NT element 103 in operation 1504. Operation 1508 constructs an XT element 104 of the forming domain 100 by grouping contextual data 140. The pieces of the contextual data 130 of the forming domain 100 may be grouped and designated as the XT element 104 similarly to the NT element 103 in operation 1504. Operation 1508 may also receive contextual data 140 from the user to be contained in the XT element 104, for example to UID 101 of one or more domains to be referenced through a contextual reference (e.g., the contextual ref 142). Operation 1510 generates a unique identifier 101 (UID 101) usable to uniquely address the forming domain 100. For example, operation 1510 may use an algorithm utilizing random or pseudo-random number generation to produce an industry-standard globally unique identifier (GUID) that is 128 bits in length.

Operation 1512 assembles a domain 100 (e.g., a completed domain 100) by bundling the TY element 102, the NT element 103, the XT element 104 and the UID 101. Each of the elements and the UID 101 may be associated with one another within the memory such that they are easily referenced together by a database, a storage technology, or another application program. For example, in the linear memory, each of the elements and the UID 101 may be deposited in close proximity, as shown and described in FIG. 1B or on ordered keys and shown and described in FIG. 1C. When placed on the ordered key-value store, each UID 101, element and attribute of each element may be defined as a key 172, and the set of keys 172 comprising the domain 100 may be placed consecutively, as shown in FIG. 1C. In one or more embodiments, however, non-ordered keys may also be used. As shown in FIG. 1D, a single document may be defined that stores each of the elements in distinct sections (which may be referred to as buckets and may be shown in JSON as bracketed "objects") and includes an attribute and value for the UID 101. Finally, operation 1514 deposits the domain in machine-readable memory (e.g., the memory).

Operations 1500 to 1514 may occur in any order. For example, operation 1506 may occur before the selection of the derivative data is received (operation 1500). Similarly, receiving a selection of the representation data 1502 may occur just before the forming domain 100 is deposited in machine-readable memory (operation 1514). An application program carrying out the operations of process flow 1550 may alternatively create and store a domain shell in the machine-readable memory and deposit each element, attribute and/or value after it is received and grouped.

FIG. 16 is a subject domain creation process flow 1650 that illustrates a process by which an application program can construct the subject domain of FIG. 2 within a memory, according to one or more embodiments. Similarly to process flow 1550, the operations of process flow 1650 are general operations that may occur in any order. Operation 1600 receives a selection of a primitive data 205 to be contained by an instantiation of the domain 100 referred to as the subject domain 200. Operation 1602 encapsulates the primitive data within a content element 203 (NT element 203) of the subject domain 200, by embedding the primitive data 205 within the NT element 203 and/or referencing a memory address that holds the primitive data 205. Operation 1604 constructs an identity element 202 (TY element 202) of the subject domain 200 by grouping identification data 220 that at least one of labels the subject domain 200 and distinguishes the subject domain 200 from any other domain 100 within a datastore. Operation 1606 constructs a context element 204 (XT element 204) of the subject domain 200 by grouping contextual data 240 that further characterizes the subject domain 200. Operation 1608 generates a unique identifier 201 (UID 201) usable to uniquely address the subject domain 200. Operation 1610 assembles the subject domain 200 by bundling the TY element 202, the NT element 200, the XT element 200 and the UID 201. Operation 1612 deposits the subject domain 200 in the machine-readable memory.

FIG. 17 is an object domain creation process flow 1750 that illustrates a process by which an application program can construct the object domain 700 of FIG. 7 within a memory, according to one or more embodiments. Operation 1700 receives a selection of a first subject domain 200 as a derivative domain (e.g., the primitive data 205A of FIG. 11 as the derivative domain 1100D) containing a primary data that is a primitive data 205 to be primarily acted upon by an application program. Operation 1702 receives a selection of a second subject domain 200 as a representation domain (e.g., the subject domain 200B of FIG. 11 as the representation domain 1101A) containing a primitive data 205 (e.g., the primitive data embedded in subject domain 200B of FIG. 11) usable by the application program to represent the primary data to facilitate a selection of the first subject domain 200 within the datastore by the application program. Operation 1704 encapsulates a reference to both the derivative domain and the representation domain within a content element 703 (NT element 703) of an object domain 700. Operation 1706 constructs an identity element 702 (TY element 702) of the object domain 700 by grouping identification data 720 that at least one of labels the object domain 700 and distinguishes the object domain 700 from any other domain 100. Operation 1708 constructs a context element 704 (XT element 704) of the object domain 700 by grouping contextual data 740 that further characterizes the subject domain 700. Operation 1710 generates a unique identifier 701 (UID 701) usable to uniquely address the object domain 700. Operation 1712 assembles the object domain 700 by bundling the TY element 702, the NT element 703, the XT element 704, and the UID 701 of the object domain 700. Similar to creation of the subject domain in FIG. 16, the process of FIG. 17 may occur in any order.

FIG. 18 is a stack domain creation process flow that illustrates a process by which an application program can construct the stack domain 800 of FIG. 8 and similarly the collection domain of FIG. 9, within a memory, according to one or more embodiments. Operation 1800 receives a selection of one or more object domains 700 to be contained by a stack domain 800. Operation 1802 receives a selection of a subject domain 800 as a representation domain containing a primitive data 205 usable by the computer application to represent the primary data to facilitate a selection of the object domain 700 within the datastore by a computer application. Operation 1804 encapsulates a reference to both the one or more object domains 700 and the representation domain within a content element 803 (NT element 803) of an stack domain 800. Operation 1806 constructs an identity element 802 (TY element 802) of the stack domain 800 by grouping identification data 820 that at least one of labels the stack domain 800 and distinguishes the stack domain 800 from any other domain 100. Operation 1808 constructs a context element 804 (XT element 804) of the stack domain 800 by grouping contextual data 840 that further characterizes the stack domain 800. Operation 1810 generates a unique identifier 801 (UID 801) usable to uniquely address the stack domain 800. Operation 812 assembles the stack domain 800 by bundling the TY element 802, the NT element 803, the XT element 804 and the UID 801. Operation 1812 deposits the stack domain 800 in the machine-readable memory. The epi-collection domain 1000 of FIG. 10 may be created with a similar process whereby, within the process flow shown in FIG. 18, the collection domain 900 is replaced with the epi-collection 1000 and stack domains 800 are replaced by the collection domain 900. Similar to creation of the subject domain 200 in FIG. 16 and the creation of the object domain 700 in FIG. 17, the process flow of FIG. 18 may occur in any order.

FIG. 19 is a subject domain creation process flow 1950 that shows a detailed process that may be used for building the subject domain 200 of FIG. 2 by the process of FIG. 16, according to one or more embodiments. Operation 1900 receives a selection of a primitive (e.g., the primitive data 105, the primitive data 205). For example, the application program creating the subject domain 200 may receive a selection from a user that is a person or a machine (e.g., a different application program) of a set of data that the user would like to place in the data structure defined by the subject domain 200. Operation 1902 generates a data structure in the memory that is a shell of the domain 100 (which may be referred to as a domain shell). The domain shell may be ready to receive additional data within each of the elements to yield the subject domain 200. Methods known in the art may be used to manage memory allocation within the physical storage device. For example, the domain shell may have specific amounts of memory (e.g., number of memory addresses, hard drive sectors) allocated for each element (e.g., the UID 201, the TY element 202, etc.) based on an expected size of data that may be placed in the domain shell. Additional processes may expand or contract the allocated memory as a user defines data to be placed in each element. Operation 1904 generates a unique identifier (UID) and operation 1906 assigns the UID to the domain shell. Operation 1908 assigns an owned ref 122 attribute and an associated value to the TY element 201 within the domain shell. Where a user is associated with an owner domain 400, the subject domain 200 created by the process flow 1850 may include a reference to the UID 401 of the owner domain 400. Operation 1910 assigns a creation date and/or time attribute and value to the TY element 201.

Operation 1912 is a decision of the application program creating the subject domain 200 that determines which portion of the contained data 130 (e.g., the primitive data 105) should be embedded in the subject domain 200 and which portion should be deposited at a remote memory address and referenced through the primitive ref 232 (which may be, for example, a pointer). For example, operation 1912 may use characteristics of the primitive data 205 as criteria for the decision, for example: size or file type (MIME type). The decision may be based on any number of other criteria such as a configuration of one or more servers holding the datastore, the nature of the physical storage device (e.g., whether it is SSD, a hard disk or RAM), or how much memory remains in the physical media at the time an application program utilizes process flow 1950.

Where the primitive data 205 is to be placed at a remote memory address, operation 1914 may place the primitive data 205 into the remote memory location and assign a value of the memory address to the primitive ref 232 attribute. Where the primitive data 205 is to be embedded, operation 1916 may place the primitive data 205 directly in the NT element 203 of the domain shell. Operation 1918 may receive a domain label and place the domain label in the TY element 202 of the domain shell. The domain label may be defined by a user (for example by the application program asking a person to enter a label for the subject domain 200) or may be automatically defined (for example an automatically generated sequential version name and/or number). Additional processes may be used to receive selections and/or define additional attributes and values, for example one or more contextual refs 242, an application sub-element and/or a legacy sub-element.

FIGS. 20A and 20B are a relation domain creation process flow 2050 that shows a detailed process that may be used for building the relation domain 300 of FIG. 3 by the process of FIG. 15, FIG. 17, and/or FIG. 18, according to one or more embodiments. Operation 2000 receives a UID selection for an instance of the domain 100 (e.g., any instantiation of the domain 100 within the datastore). Operation 2002 determines whether creating a reference to the instance of the domain 100 would violate architectural constraints placed on the relation domain 300. For example, the stack domain 800 may be defined such that it can only reference instances of the object domain 700 and one subject domain 200 to act as a representation domain. Where a selection of a UID 901 was received, the architecture would be violated and operation 2004 would generate an error message for the user. Similarly, operation 2002 may determine whether a directed cycle would be formed if referential attributes within the contained data 330 must conform to the directed acyclic graph (DAG) architecture 600 of FIG. 6. Where analysis of the UID 101 (to act as a value of a referential attribute) yields a permissible relation, operation 2006 determines whether an additional domain should be referenced, and, if so, returns to process 2000. For example, the user may successively define instances of the domain 100 to reference from the forming domain and/or to related to one another. Operation 2008 may generate a domain shell and place the domain shell in the memory. Operation 2010 may generate a unique identifier 301 (UID 301).

Continued in FIG. 20B, operation 2012 assigns a creation date to the TY element 301 of the domain shell. Operation 2014 determines whether the relation domain 300 should include a representation. The representation may be a reference to the representation domain 1101 of FIG. 11. Where a representation is included, process 2016 receives a UID 201 of a subject domain 200 that includes data (e.g., a primitive 205) usable by an application program to represent the relation domain 300. Alternatively, although not shown in process flow 2050, the representation could be embedded in the NT element 303 (or the NT element 103 of any instantiation of the domain 100). Operation 2018 defines the contained data 330 in the NT element 303, for instance by associating all attributes and values of the referenced domains including any representation domain. Operation 2020 receives the domain label, and operation 2022 deposits the finished relation domain 300 in the memory. Process flow 2050 may be used to form any of the instantiations of the relation domain 300, for example the object domain 700, the subject domain 800, the collection domain 900, the epi-collection domain 1000 and/or any other type of relation domain 300. Additional processes that may be disclosed in co-pending patent applications by related inventive entities and/or assignees of rights associated with the present embodiments may be used to form the hastory 124.

Data to be added to NT element 103 (such as data that may become the primitive 105) may come from a different data structure such as a hierarchical file system and may include metadata not directly used by the domain 100. Storage of "legacy" information related to a location where the data originally came from may help determine a context for use of the data by an application program and, more importantly, may allow the data to be removed form the domain 100 and returned to its original state, as shown in the process flow of FIG. 22.

FIG. 21 is a legacy archive process flow 2150 showing a process by which data stored in a different data model, such as a file stored in a hierarchical file system, may have metadata and origin data organized into a legacy sub-element within the XT element of the subject domain, according to one or more embodiments. Operation 2100 generates the legacy sub-element 144 in the XT element 104 (or what may be referred to for a subject domain 200 as the legacy sub-element 244 of the XT element 204). Operation 2102 extracts metadata from the file. The metadata subject to extraction may be detected automatically by scanning the file and/or analyzing known metadata protocols for a given MIME type. The file may become the primitive data 205. The metadata may be stored as the value of a single attribute in a BLOB (or more complex processes may be applied to the metadata define individual attributes-value pairs for each piece of metadata).

Operation 2104 may deposit the file metadata in the legacy sub-element 244, as shown and described in conjunction with FIG. 1E. Operation 2106 deposits a restore path in the XT element 204, and specifically may deposit the restore path in the legacy sub-element 244. The restore path, for example, may be a file path that points to a file system location by following a directory tree hierarchy expressed in a string of characters in which path components, separated by a delimiting character, represent each directory (e.g., C:\Documents\Music\November_5.wav). A path may also be comprised of a uniform resource locator (URL). Operation 2108 deposits a restore IP address in the XT element 204 (e.g., in the legacy sub-element 244). The restore IP address may be an Internet protocol address from which the original file was received. Where the original file was in a local system, for example from a local network address and/or otherwise not received through the Internet, the restore IP address may remain unspecified or include a different type of origin network address (e.g., a MAC address). Operation 2110 deposits the original name of the file in the XT element 204.

FIG. 22 is a legacy file reconstruction process flow 2250 showing how data within the legacy sub-element 144 can be used to reconstitute the original file and return it to its original location, according to one or more embodiments. In operation 2200, the primitive data 205 is extracted from the NT element 103 of the subject domain 200. The original name of the file may be stored in the legacy sub-element 244. Operation 2204 appends instructions usable to place the file at the end of the restore path. Operation 2206 transmits a request to restore the file along the restore IP address where an application program may receive the request, determine the appropriate placement of the file using the restore path, and deposit the reconstituted file in memory (e.g., by in a hierarchical file system). Additional processes, not shown, may remove the legacy sub-element 244 from the subject domain 200 and/or delete the subject domain 200.

Figure 23:
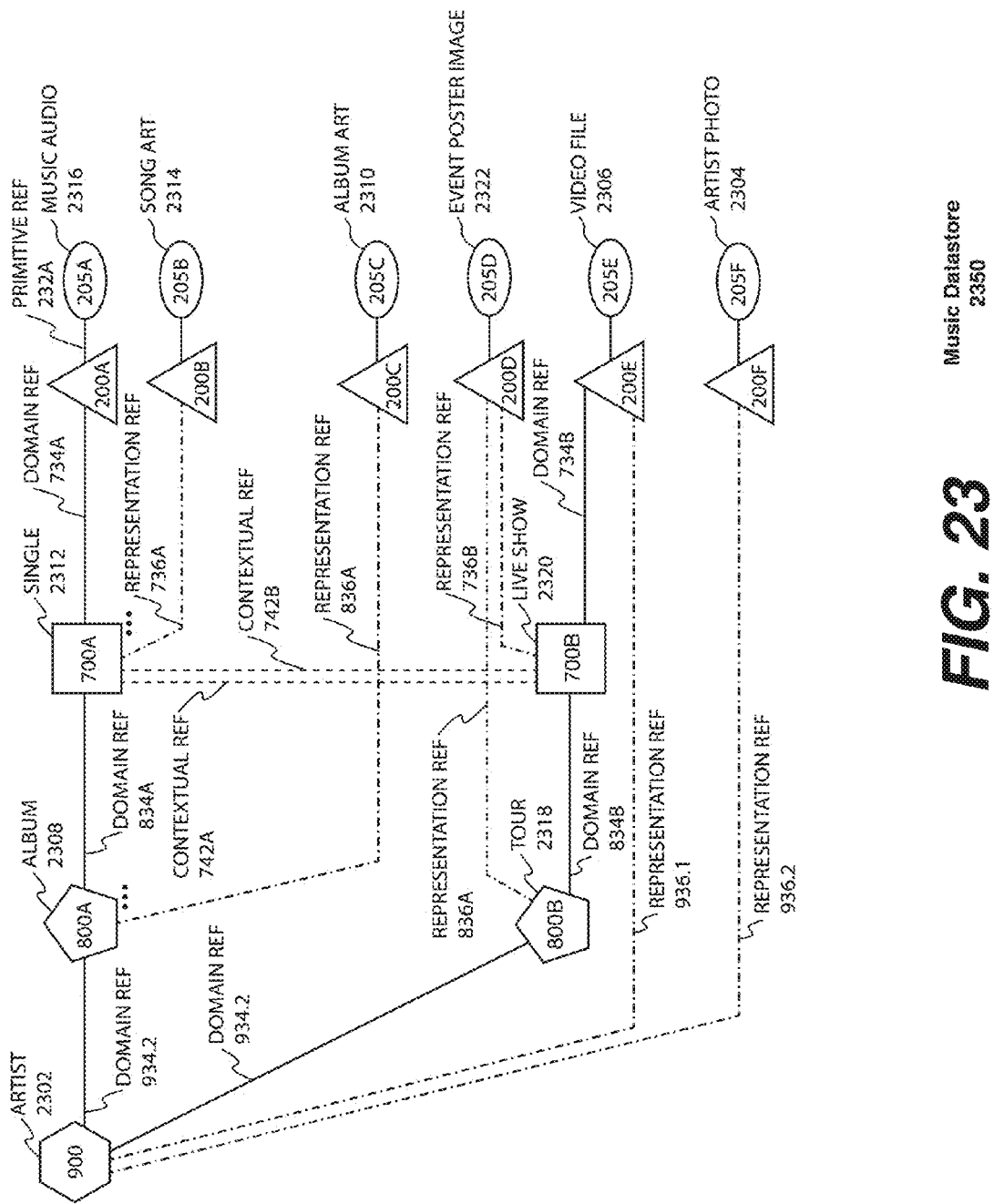
FIG. 23 illustrates a music datastore semantically arranging audio and visual content according to a data structure comprising instantiations of the domain of FIG. 1A, the music datastore usable by a cloud computing platform to stream audio to mobile devices, according to one or more embodiments.

A specific example of the use of the domain 100 as a data structure for a cloud computing platform powering a content delivery network will now be described. FIG. 23 illustrates a music datastore semantically arranging audio and visual content according to a data structure comprising instantiations of the domain of FIG. 1A, the music datastore usable by a cloud computing platform to stream audio to mobile devices (e.g., an iPhone®, an Android® phone), according to one or more embodiments. In FIG. 23, a musical artist (the artist 2302) may be modeled by a collection 900. The collection 900 may include within its contained data 930 a reference to two stack domains 800A and 800B (e.g., referenced through the domain ref 934.1 and 934.2 attributes): the stack domain 800A modeling an album 2308 that the artist recorded and the stack domain 800B modeling a tour 2318 on which the artist performed. A video file 2306 (e.g., the primitive data 205E) is contained within the NT element 204 of the subject domain 200E and an artist photo 2304 (e.g., the primitive data 205F) is contained within the NT element 204 of the subject domain 200F.

An application program may address the collection domain 900 to utilize it as a data resource. For example, the application program running on a device (such as a computer, a tablet, or a smartphone) may utilize the collection domain 900 to populate a user interface (UI) with data to be presented to a user of the application program. The user may then use the UI, as populated in response to additional user inputs, to navigate to a fundamental piece of data such as a message or audio file that may be contained in a subject domain 200. A user interface view telling about the particular artist 2302 may query the datastore by addressing the collection domain 900 for attributes within the NT element 903 and/or XT element 904. The query may return instances of the UID 101 for the album 2308 (e.g., the UID 801A), the tour 2318 (e.g., the UID 801B), the video file 2306 (e.g., the UID 201E) and the artist photo 2304 (e.g., the UID 201F).

The application program may then query against the datastore for each of these resources and utilize data within each returned domain in a process of the application program such as populating the user interface. For example, the artist photo 2304 may be used as a backdrop for the user interface view, the video file 2306 may play in a small window in one portion of the UI view, and the artist name (e.g., a value that may be returned from an artist name attribute in the XT element 904 or the TY element 402) may be placed at the top of the user interface view. In addition, a portion of the user interface may also be populated with a set of depictions of albums that the artist has recorded. In that case, a query against the stack 800A would follow the value of the representation ref 836A attribute to retrieve the primitive 205B (e.g., album art 2310) from subject domain 200C. Although only one album is shown, several such albums modeled by stack domains 800 may exist in the datastore and may be used to populate the user interface or provide additional data for processes of the application program.

Figure 25C:
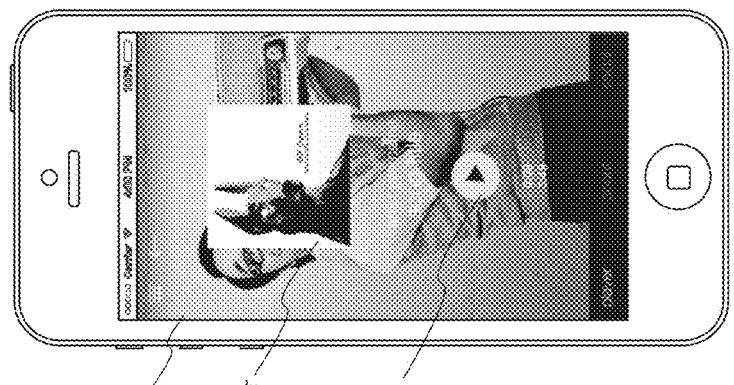
FIG. 25A, FIG. 25B, and FIG. 25C are user interface views of an application program utilizing the music datastore of FIG. 23, according to one or more embodiments.
Figure 25B:
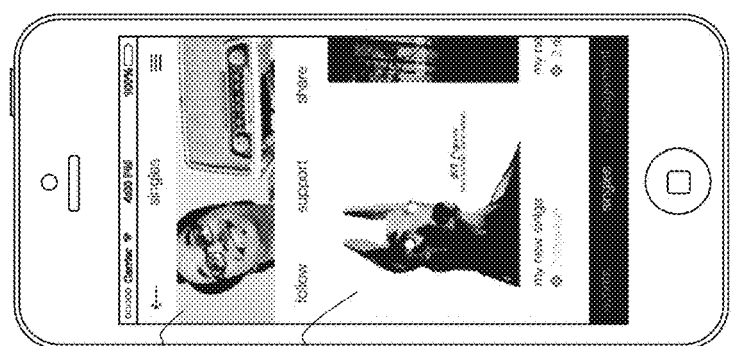
Figure 25A:
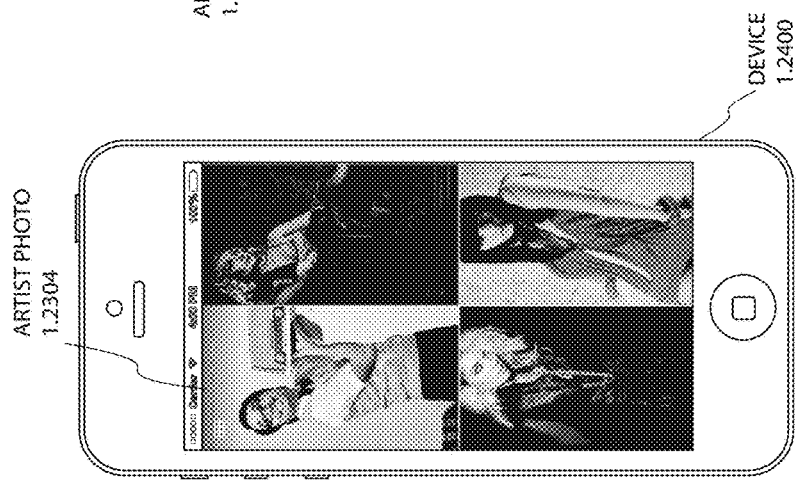

Similarly, in the embodiment of FIG. 23, when a user of the application program selects the particular album to which he or she may wish to listen, the application program may query against the datastore for the stack 800A, then follow each domain ref 834 to a set of object domains 700 modeling a musical single. The user interface view for a particular album might have a backdrop of the album art 2310, and then follow each value of the representation ref 236 attributes (e.g., the representation ref 236A) to a subject domain 200 (e.g., subject domain 200B having a primitive 205B that is the song art 2314). Once the user navigates to another user interface view for a particular single, the user interface may be primarily populated with the song art 2314 and then the application program may query against the datastore for the subject domain 200A to deliver (e.g., stream) the primitive 205A (that is the music audio 2316 in FIG. 23). FIG. 25A through FIG. 25C demonstrates examples of a user interface of an application program populating by querying against instances of the domain 100.

Similarly, the object domain 700B may model a live show 2320 that is a relationship between a video of the live show (the video file 2306) and the event poster image 2322. Where the single 2312 was played during the live show 2306 and thus part of the video file 2306, the object domain 700A may reference the object domain 700B through contextual ref 742A (e.g., an attribute such as "Played_Live") to establish a contextual relationship that the single appears in footage of the live show 2320. Similarly, object domain 700B may reference object domain 700A through contextual ref 742B (e.g., an attribute such as "Studio_Recording") to establish that a single appearing within the live show has a sound-studio recording.

FIG. 24A is an example of music data that can be stored within the subject domain 200A of FIG. 23 shown in the entity-attribute-value representation of FIG. 1E, according to one or more embodiments. The identity element (the TY element 202A) includes attributes for a Name of the domain (e.g., a label for the domain), a Date_Created, a Date_Modified, and a reference to an owner domain (e.g., an instance of the owned ref 222). In FIG. 24A, the content element (e.g., the NT element 203A) contains a primitive attribute (the Primitive_Ref 232), the value of which is a memory address. The primitive data 205A may be the music audio 2316 of FIG. 23. The context element (the XT element 204) includes an owner domain 400 associated with an application program that added the subject domain 200A to the datastore (e.g., that "published" the domain 200A), and may also contain analytical data, such as how many times the subject domain 200A has been accessed by users of the datastore (e.g., a value of the Total_Spins attribute). In the embodiment of FIG. 24A, the context element may include the legacy sub-element for reconstitution of the original file from which the primitive 205A derived. The value of the metadata attribute may be stored as a BLOB. The context element may also include the application sub-element comprising application-specific data associated with use of the domain as a data resource for a specific application program. The application may have an associated owner domain (e.g., the domain referenced by the Application attribute in FIG. 24A), include a variation on the title of the single (which may allow the artist to adjust the single name as it is used by the specific application program), and/or may include additional data that the particular application program would like accessible at the time the subject domain 200A is addressed by a user (e.g., a link to a website to which the artist may wish a user of the application program to visit to purchase music files).

FIG. 24B is an example of the music data that could be within the object domain of FIG. 23 shown in the entity-attribute-value representation of FIG. 1E, according to one or more embodiments. Many of the attributes and values of FIG. 24B are similar to FIG. 24A. The content element (NT element 703A) includes the Derive_Audio attribute, the value of which is the UID 201A of the subject domain 200A of FIG. 24A. The NT element 703A of FIG. 24B also includes the Representation attribute, the value of which is the UID 201B of the subject domain 200B (e.g., the subject domain containing the song art 2314). The Played_Live attribute of the application sub-element may be the unconstrained reference to a different domain 100 containing a live performance that included the music single (e.g., the object domain 700B in FIG. 23).

FIG. 25A, FIG. 25B, and FIG. 25C are user interface views of an application program utilizing the music datastore of FIG. 23, according to one or more embodiments. FIG. 25A shows a user interface view on a device 2400 (specifically, an iPhone®), the user interface of the device 2400 displaying photographs of four musical artists that may be featured on the application program. The artist photo 2304 may occur as one of the photographs on the user interface. When the user of the application program selects the artist photo 2304, the application program may re-format the artist photo 2304 and place it in the upper-most portion of the screen. The application program may query the datastore and return both a list of singles (e.g., the single 2312) performed by the artist and representations of the list of singles 2312 (e.g., song art 2314A, 2314B, etc.). The application program displayed in FIG. 25A through FIG. 25C does not reference albums, but instead may query against the datastore to find all singles of the artist while ignoring albums of the artist. When a user selects a particular single (e.g., the single 2312), the user interface view of FIG. 25C may populate, reformatting the artist photo 2304 and song art 2314A. Activating a play button in the middle of the user interface may send a request to a remote server (e.g., the subject server 1301) for the subject domain 200A and return the music audio 2316 (e.g., the primitive 205A of FIG. 23) to the device 2400 to be played for the user of the application program.

Figure 26:
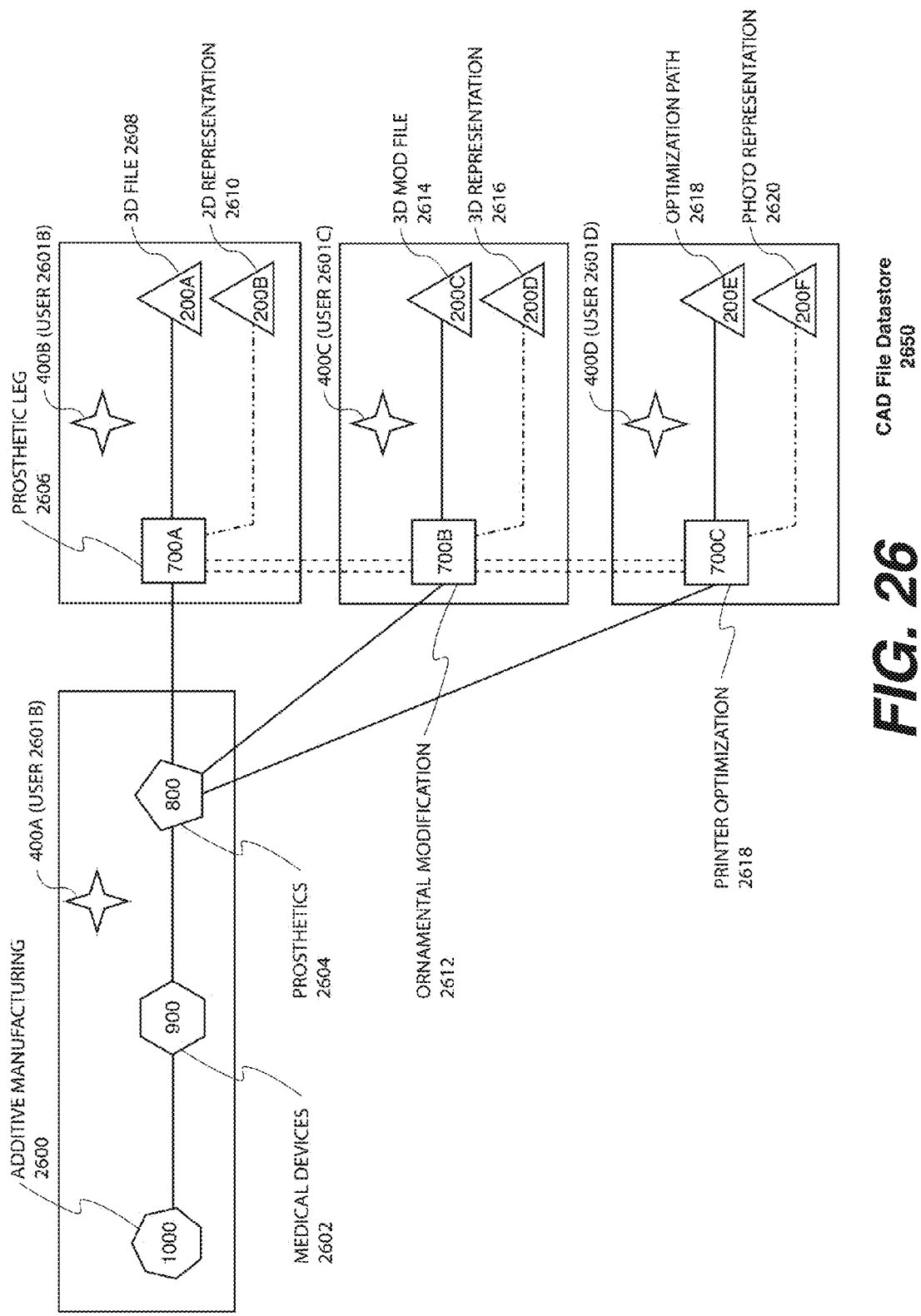
FIG. 26 illustrates CAD file datastore comprising CAD files and corresponding representation images semantically arranged in a data structure comprising the instantiations of the domain 100 of FIG. 1A, the data structure usable by a cloud computing platform to stream the CAD files to a manufacturing device such as a 3D printer, according to one or more embodiments.

FIG. 26 illustrates CAD file datastore 2650 comprising CAD files and corresponding representation images semantically arranged in a data structure comprising the instantiations of the domain 100 of FIG. 1A, the data structure usable by a cloud computing platform to stream the CAD files to a manufacturing device such as a 3D printer, according to one or more embodiments. In FIG. 26, a datastore includes domains 100 owned by distinct users: the user 2601A (the owner domain 400A), the user 2601B (the owner domain 400B), the user 2601C (the owner domain 400C), and the user 2601D (the owner domain 400D). The owner domain 400A may represent a machine-user that owns several representation domains 300 organizing and drawing relationships between the domains 100 owned by other users of the datastore. For example, the owner domain 400A may own the epi-collection 1000 holding relationships to several categories of additive manufacturing 2600, the collection 900 holding relationships to medical devices 2602, and the stack 800 holding relationships for prosthetics 2604. In FIG. 26, the stack 800 references a CAD file that is a prosthetic leg 2606, the object domain 700A, which is owned by he owner domain 400B. The object domain 700A be a relationship between a subject domain 200A containing a 3D file 2608A (e.g., as a primitive 205A). A subject domain 200A that contains a 2D representation 2610 The 2D representation may be, for example, a rendered image of the 3D file from a fixed perspective. Similarly, stack domain 800 may also contain a reference to the object 700B. The object 700B may be an ornamental modification 2612 of the prosthetic leg 2606. The 3D mod file 2614 may be used to modify the 3D file 2608 to add ornamentation. For example, an application program may load the 3D file 2608 and then apply modification processes specified in the 3D mod file 2614. In contrast to the prosthetic leg 2606, the ornamental modification 2612 may have a 3D representation 2606 that may allow a user to rotate a menu item to inspect ornamental features and/or an industrial design. Shown by two vertical dashed lines, the object domain 700A and 700B may contain contextual references to one another (e.g., through the NT elements 704A and 704B). A first contextual reference from object domain 700A to 700B may allow an application program to determine that there exists a mod in the datastore for the prosthetic leg 2606; a second contextual reference in object domain 700B to 700A may allow an application program to find the original file (e.g., 3D file 2608) that the 3D mod file 2614 modifies.

Similarly, stack domain 800 may reference object domain 700C containing an optimization path 2618 (as the subject domain 200E) for the 3D mod file 2614 and a photo representation 2620 (as the subject domain 200F) that may, for example, be a photo of the 3D printer for which the optimization path 2618 is intended. Analogous to the contextual references between object domains 700A and 700B, contextual references may be made between object domains 700B and 700C to allow an application program instant access to related resources. Although not shown in FIG. 26, each individual user may define security domains 500 over one or more domains 100 owned by the user. For example, the user 400C may create a security domain 500 that protects the object domain 700B and define a control policy 552 that, while freely allowing the 3D representation 2616 to be accessed by an application program, limits access to the 3D mod file 2614 for particular users. For example, the control policy 552 may require payment verification before granting access to the 3D mod file 2614.

Although the present embodiments have been described with reference to specific example embodiments, it will be evident that various modifications and changes may be made to these embodiments without departing from the broader spirit and scope of the various embodiments. For example, the various devices, engines and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application-specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., the server 1200, the device 2500). Accordingly, the specification and drawings are to be regarded in an illustrative rather than a restrictive sense.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the preceding disclosure.

We claim:

1. A physical memory usable to store information within a datastore, the memory comprising:
  a number of domains each organizing data into a domain structure that includes:
    a unique identifier (UID) whereby a particular domain is uniquely addressable within the datastore;
    an identity element (TY element) comprising a first set of attribute-value pairs that include identification data usable to at least one of label the particular domain and distinguish the particular domain from any other domain within the datastore;
    a content element (NT element) comprising a second set of attribute-value pairs that include contained data that the particular domain contains;
    a context element (XT element) comprising a third set of attribute-value pairs that include contextual data that further characterizes the particular domain
      wherein each of the TY element, the NT element, and the XT element are individually addressable within the datastore such that at least one of: (i) only the first set of attribute-value pairs that include identification data usable to label the particular domain and distinguish the particular domain from any other domain within the datastore; (ii) only the second set of attribute-value pairs that include data that the particular domain contains, and (iii) only the third set of attribute-value pairs that include contextual data that further characterizes the particular domain, can be returned in response to a single query without returning additional data of the particular domain.

2. The memory of claim 1, wherein at least one of the number of domains is:
  a fundamental instantiation of the domain structure referred to as a subject domain which is defined by the contained data of the subject domain being a primitive data that is at least one of embedded in the NT element and referenced through a reference to one or more memory addresses containing the primitive data; and
a relational instantiation of the domain structure referred to as a relation domain, the relation domain defined by the contained data of the relation domain comprising one or more references to each of one or more other domains.

3. The memory of claim 2, wherein a set of the relation domains model a set of containing relationships using a directed acyclic graph (DAG) architecture, each NT element of each of the relation domains a vertex of the DAG architecture and each of the one or more references within the contained data of each of the set of relation domains a directed edge of the DAG architecture.

4. The memory of claim 3, wherein one or more of the number of domains model contextual relationships by including within the contextual data of the one or more domains an unconstrained reference to any other domain.

5. The memory of claim 4, wherein at least one of the number of domains is:
an owner instantiation of the domain structure referred to as an owner domain that references each domain owned by the owner domain,
wherein each domain is owned by one and only one instance of the owner domain, and
wherein the identification data of the each of the domains that is owned by the instance of the owner domain includes a reference to the instance of the owner domain;
a user instantiation of the owner domain referred to as a user domain and representing an owner that is a person; and
a machine-user instantiation of the owner domain referred to as a machine-user domain representing an owner that is an application program.

6. The memory of claim 5, wherein at least one of the number of domains is:
an object instantiation of the relation domain referred to as an object domain, the object domain defined by the contained data of the object domain comprising a reference to each of one or more subject domains;
a stack instantiation of the relation domain referred to as a stack domain, the stack domain defined by the contained data of the stack domain comprising a reference to each of two or more object domains; and
a collection instantiation of the relation domain referred to as a collection domain, the collection domain defined by the contained data of the collection domain comprising a reference to each of two or more stack domains.

7. The memory of claim 6,
wherein the contained data of the object domain further comprises a reference to a first instance of the subject domain and a second instance of the subject domain, the first instance having contained data to be primarily acted upon by an application program and the second instance usable by the application program to represent the first instance in order to facilitate a selection of the data to be primarily acted upon by the application program,
wherein the contained data of the stack domain further comprises a reference to an instance of the subject domain usable by one or more application programs to represent the contained data of the stack domain, and
wherein the contained data of the collection domain further comprises a reference to an instance of the subject domain usable by one or more application programs to represent the contained data of the collection domain.

8. The memory of claim 1,
wherein the identification data usable to at least one of label the particular domain and distinguish the particular domain from any other domain within the datastore comprises at least one of a reference to an instance of the owner domain that owns the particular domain, a name of the domain, an alphanumeric string that labels the domain, a unique property of the particular domain, a unique relation of the particular domain, a property with a low occurrence within the datastore, a relation with a low occurrence within the datastore, and a time stamp of at at least one of a time the particular domain was created and a time the particular domain was modified,
wherein the primitive data is at least one of a binary encoded text, an alphanumeric string, a number, a media file, a binary large object (BLOB), an audio file, a video file, a text file, a file of any MIME type, a cryptographic key, and a document,
wherein the contextual data includes at least one of a characteristic, a color, a physical property, a state, a version, a description of the particular domain, a non-containing relationship to another domain within the datastore, a use for the particular domain, a location, and an example of the particular domain.

9. The memory of claim 7, wherein the contextual data of one or more of the number of domains further comprises application-specific data associated with an application program for which the one or more of the number of domains is an application resource.

10. The memory of claim 9, wherein at least one of the number of domains is:
a security instantiation of the domain structure referred to as a security domain, the security domain protecting with a control policy defining an authorized context for which use of a protected resource is authorized, the protected resource stored within at least one of the security domain and stored within the subject domain referenced by the security domain referred to as a shielded domain.

11. The memory of claim 10,
wherein the control policy comprises a control algorithm comprising one or more conditionals each accepting as an input at least one of the set of control values and at least one outside values that is from outside of the security domain and,
wherein the set of control values includes at least one of a location of a device, a geospatial coordinate of the device, a type of the device, an operating system of the device, an application program, a query time, a query date, a number of uses of data of the protected resource, a type of use of data of the protected resource, a number of accesses of data of the shielded domain, a duration of use of the data within the shielded domain, and an identifier of a user of the device.

12. The memory of claim 11,
wherein at least one of the set of domains modeling the directed acyclic graph DAG architecture are referenced by a first vertex of the NT element of a first relation domain and also referenced by a second vertex of the NT element of a second relation domain.

13. A physical memory usable to store information within a datastore, the memory comprising:

a number of domains each organizing data into a domain structure that includes:
  a unique identifier (UID) whereby a particular domain is uniquely addressable within the datastore;
  an identity element (TY element) comprising a first set of attribute-value pairs that include identification data comprising at least one of a reference to an owner of the particular domain, a name of the domain and a time stamp of a time that the particular domain was created;
  a content element (NT element) comprising a second set of attribute-value pairs that include contained data that the particular domain contains; and
  a context element (XT element) comprising a third set of attribute-value pairs that include contextual data that further characterizes the particular domain
  wherein each of the TY element, the NT element, and the XT element are individually addressable within the datastore such that at least one of: (i) only the first set of attribute-value pairs that include identification data usable to label the particular domain and distinguish the particular domain from any other domain within the datastore; (ii) only the second set of attribute-value pairs that include data that the particular domain contains, and (iii) only the third set of attribute-value pairs that include contextual data that further characterizes the particular domain, can be returned in response to a single query without returning additional data of the particular domain.

14. The memory of claim 13, wherein the number of domains further comprises:
  a fundamental instantiation of the domain structure referred to as a subject domain which is defined by the primitive data being at least one of a binary encoded text, an alphanumeric string, a number, a media file, a binary large object (BLOB), an audio file, a video file, a text file, a file of any MIME type, a cryptographic key, and a document; and
  an object instantiation of the domain structure referred to as an object domain, the object domain defined by the contained data of the object domain comprising a reference to a first instance of the subject domain and a second instance of the subject domain, the first instance having a first primitive data to be primarily acted upon by an application program and the second instance having a second primitive data usable by the application program to represent the first instance of the subject domain in order to facilitate a selection of the primitive data to be primarily acted upon.

15. The memory of claim 14, wherein the number of domains further comprises:
  a stack instantiation of the domain structure referred to as a stack domain, the stack domain defined by the contained data of the stack domain comprising a reference to each of two or more object domains along with a reference to one instance of the subject domain having a third primitive data usable by the application program to represent the stack; and
  a collection instantiation of the domain structure referred to as a collection domain, the collection domain defined by the contained data of the collection domain comprising a reference to each of two or more stack domains along with a reference to one instance of the subject domain having a fourth primitive data usable by the application program to represent the stack.

16. The memory of claim 13, further comprising:
  an ordered key-value store, each key-value pair of the key-value store storing each attribute-value pair within the first set of key value pairs of the TY element, the second set of key-value pairs of the NT element, and the third set of key-value pairs of the XT element.

* * * * *